US012625712B2

(12) United States Patent
Smith

(10) Patent No.: US 12,625,712 B2
(45) Date of Patent: May 12, 2026

(54) QUANTUM VIRTUAL MACHINE FOR SIMULATION OF A QUANTUM PROCESSING SYSTEM

(71) Applicant: Rigetti & Co, LLC, Berkeley, CA (US)

(72) Inventor: Robert Stanley Smith, Emeryville, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 964 days.

(21) Appl. No.: 17/251,766

(22) PCT Filed: Jun. 13, 2019

(86) PCT No.: PCT/US2019/037070
§ 371 (c)(1),
(2) Date: Dec. 11, 2020

(87) PCT Pub. No.: WO2019/241570
PCT Pub. Date: Dec. 19, 2019

(65) Prior Publication Data
US 2021/0132969 A1     May 6, 2021

Related U.S. Application Data

(60) Provisional application No. 62/684,609, filed on Jun. 13, 2018.

(51) Int. Cl.
*G06F 9/455*        (2018.01)
*G06F 9/30*         (2018.01)
(Continued)

(52) U.S. Cl.
CPC ............ *G06F 9/45504* (2013.01); *G06F 9/30* (2013.01); *G06N 10/60* (2022.01); *G06N 10/80* (2022.01); *B82Y 10/00* (2013.01); *G06F 17/16* (2013.01)

(58) Field of Classification Search
CPC ........ G06F 9/45504; G06F 9/30; G06F 17/16; G06N 10/00; G06N 10/80; B82Y 10/00
See application file for complete search history.

(56) References Cited

U.S. PATENT DOCUMENTS 9,537,953 B1     1/2017  Dadashikelayeh et al.
2008/0313430 A1*  12/2008  Bunyk ................... G06N 10/00
                                                              712/E9.082
(Continued)

OTHER PUBLICATIONS

Smelyanskiy et al. ("aHiPSTER: The Quantum High Performance Software Testing Environment", 2016, pp. 9, arXiv: 1601.07195v2.*

(Continued)

*Primary Examiner* — Li Wu Chang
(74) *Attorney, Agent, or Firm* — Fenwick & West LLP

(57) ABSTRACT

Quantum operations can be simulated on a classical processing system using a quantum virtual machine (QVM). The QVM receives a quantum virtual state including a virtual wavefunction of n qubits. The virtual wavefunction is represented by probability amplitudes stored in a memory location of the classical processing system. The QVM simulates a received quantum operation by determining a set of virtual partial wavefunctions, accessing probability amplitudes for the virtual partial wavefunctions, and executing the quantum operation on the sub-bitstrings. The QVM can measure the result of the quantum operation, add noise, share the virtual wavefunction, or generate efficient machine instructions when simulating the quantum operation.

27 Claims, 12 Drawing Sheets

Method
700

Receive a quantum algorithm comprising a quantum operation acting on at least one qubit of a virtual wavefunction
710

Determine the ordered sequence of quantum sub-bitstrings
720

Access the complex amplitudes of each qubit of the sequence of virtual sub-wavefunctions
730

Execute the quantum operation on the accessed complex amplitudes on the qubits of the sequence of virtual sub-wavefunctions
740

Store the complex amplitudes for each of the at least one qubits the quantum operation acted upon
750

Determine the result of the quantum algorithm based on the stored resulting complex amplitudes or measurement
760

(51) Int. Cl.
    *G06N 10/60*         (2022.01)
    *G06N 10/80*         (2022.01)
    *B82Y 10/00*         (2011.01)
    *G06F 17/16*         (2006.01)

(56)            References Cited

U.S. PATENT DOCUMENTS

| | | |
|---|---|---|
| 2014/0187427 A1 | 7/2014 | Macready et al. |
| 2018/0096085 A1 | 4/2018 | Rubin |
| 2020/0274554 A1* | 8/2020 | Aspuru-Guzik ....... G06N 10/00 |

OTHER PUBLICATIONS

Viamontes et al. ("Gate-Level Simulations of Quantum Circuits", 2008, pp. 17, arXiv:quant-ph/0208003v1.*
Steiger et al. ("ProjectQ: An Open Source Software Framework for Quantum Computing", Jan. 2018, pp. 13, arXiv: 1612.08091v2.*
PCT International Search Report and Written Opinion, PCT Application No. PCT/US2019/037070, Oct. 8, 2019, 10 pages.
Lanzagorta, M. et al., "Hybrid Quantum-Classical Computing with Applications to Computer Graphics," SIGGRAPH '05 ACM SIGGRAPH 2005 Courses, Article No. 2, Aug. 4, 2005, 19 pages.
Smith, R.S. et al., "A Practical Quantum Instruction Set Architecture," arXiv:1608.03355v2, 2016, 15 pages, [Online] [Retrieved on Sep. 19, 2019] Retrieved from the Internet<URL:https://arxiv.org/abs/1608.03355>.

\* cited by examiner

Method
700

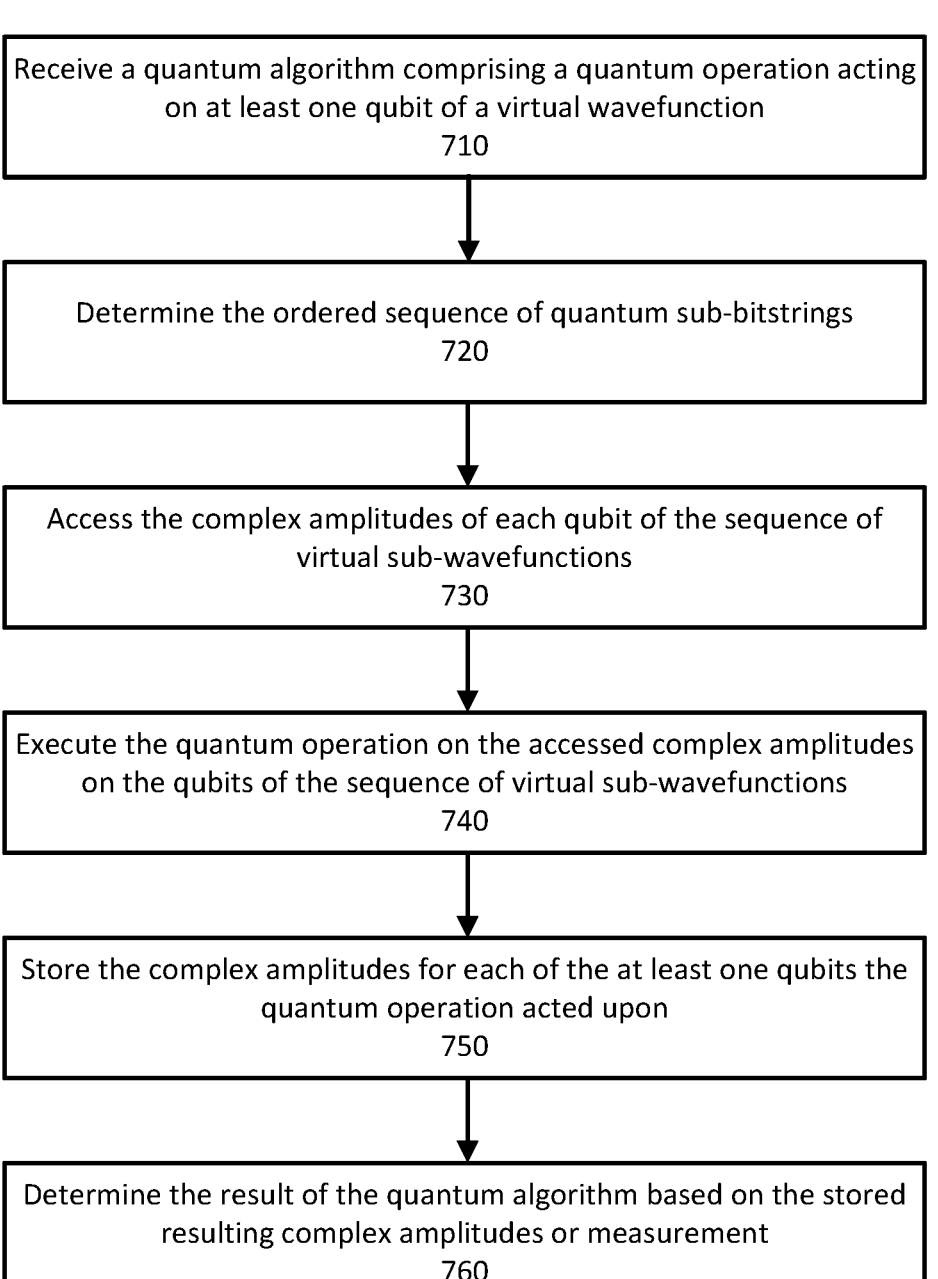

Receive a quantum algorithm comprising a quantum operation acting
on at least one qubit of a virtual wavefunction
710

Determine the ordered sequence of quantum sub-bitstrings
720

Access the complex amplitudes of each qubit of the sequence of
virtual sub-wavefunctions
730

Execute the quantum operation on the accessed complex amplitudes
on the qubits of the sequence of virtual sub-wavefunctions
740

Store the complex amplitudes for each of the at least one qubits the
quantum operation acted upon
750

Determine the result of the quantum algorithm based on the stored
resulting complex amplitudes or measurement
760

FIG. 7

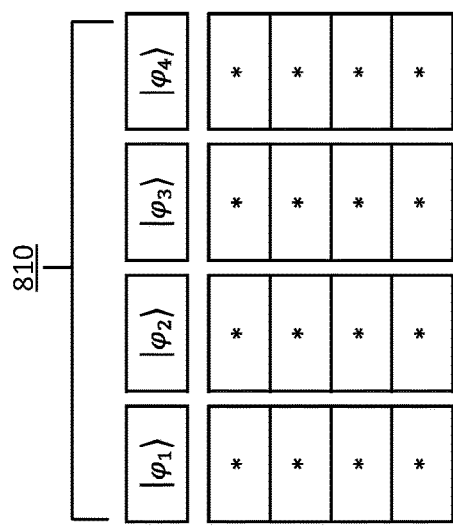

| 802 | 804 | | | | 806 | 808 |
| $\lvert \psi_{n=4} \rangle$ | Bitwise Address | | | | P. Amp. | M. Loc. |
| $\lvert \psi_{0000} \rangle$ | 0 | 0 | 0 | 0 | $\alpha_{0000}$ | $L_1$ |
| $\lvert \psi_{0001} \rangle$ | 0 | 0 | 0 | 1 | $\alpha_{0001}$ | $L_2$ |
| $\lvert \psi_{0010} \rangle$ | 0 | 0 | 1 | 0 | $\alpha_{0010}$ | $L_3$ |
| $\lvert \psi_{0011} \rangle$ | 0 | 0 | 1 | 1 | $\alpha_{0011}$ | $L_4$ |
| $\lvert \psi_{0100} \rangle$ | 0 | 1 | 0 | 0 | $\alpha_{0100}$ | $L_5$ |
| $\lvert \psi_{0101} \rangle$ | 0 | 1 | 0 | 1 | $\alpha_{0101}$ | $L_6$ |
| $\lvert \psi_{0110} \rangle$ | 0 | 1 | 1 | 0 | $\alpha_{0110}$ | $L_7$ |
| $\lvert \psi_{0111} \rangle$ | 0 | 1 | 1 | 1 | $\alpha_{0111}$ | $L_8$ |
| $\lvert \psi_{1000} \rangle$ | 1 | 0 | 0 | 0 | $\alpha_{1000}$ | $L_9$ |
| $\lvert \psi_{1001} \rangle$ | 1 | 0 | 0 | 1 | $\alpha_{1001}$ | $L_{10}$ |
| $\lvert \psi_{1010} \rangle$ | 1 | 0 | 1 | 0 | $\alpha_{1010}$ | $L_{11}$ |
| $\lvert \psi_{1011} \rangle$ | 1 | 0 | 1 | 1 | $\alpha_{1011}$ | $L_{12}$ |
| $\lvert \psi_{1100} \rangle$ | 1 | 1 | 0 | 0 | $\alpha_{1100}$ | $L_{13}$ |
| $\lvert \psi_{1101} \rangle$ | 1 | 1 | 0 | 1 | $\alpha_{1101}$ | $L_{14}$ |
| $\lvert \psi_{1110} \rangle$ | 1 | 1 | 1 | 0 | $\alpha_{1110}$ | $L_{15}$ |
| $\lvert \psi_{1111} \rangle$ | 1 | 1 | 1 | 1 | $\alpha_{1111}$ | $L_{16}$ |

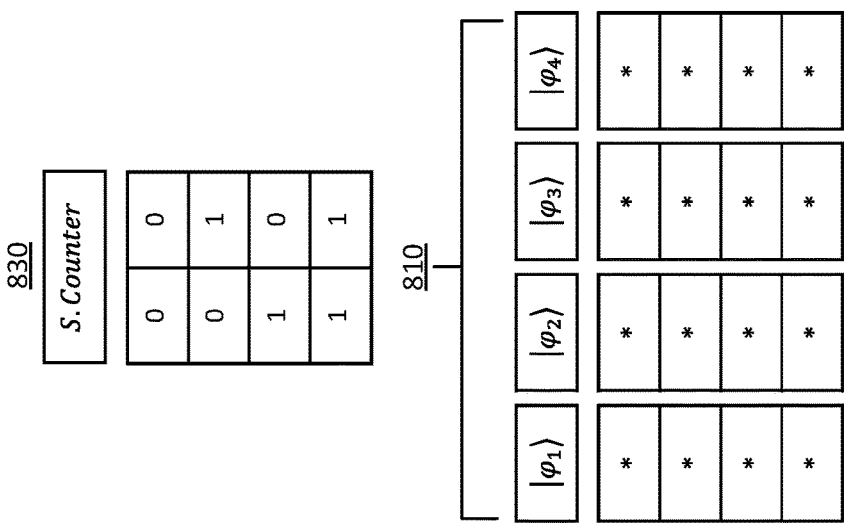
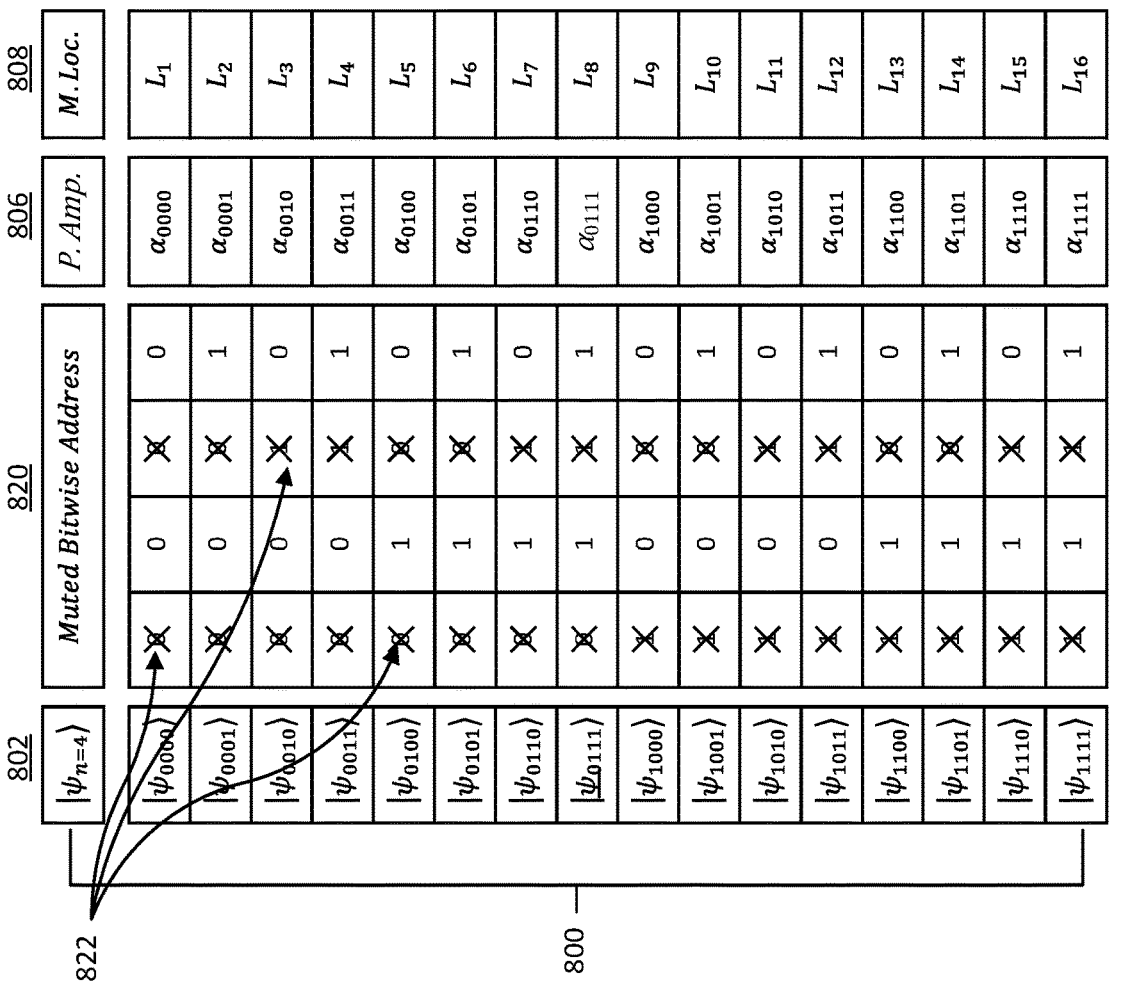
FIG. 8B

QUANTUM VIRTUAL MACHINE FOR SIMULATION OF A QUANTUM PROCESSING SYSTEM

CROSS-REFERENCE TO RELATED APPLICATIONS

This application claims the benefit of U.S. Provisional application No. 62/684,609 filed on Jun. 13, 2018, which is incorporated in its entirety by this reference.

BACKGROUND OF THE INVENTION

1. Field of the Invention

This invention relates generally to executing algorithms on a hybrid classical/quantum computing system, and in particular to a quantum virtual machine for simulating the quantum hardware operations on a classical computation system.

2. Description of the Related Art

Quantum computation systems excel at solving complex problems which are often unsolvable using classical computation systems. However, physical quantum computation systems of the desired computing power may not be presently available with enough fidelity or performance to execute certain quantum algorithms of interest. Additionally, debugging algorithms on physical hardware is an expensive endeavor. Therefore, in such cases, it would be beneficial to be able to simulate the execution of a quantum algorithm on a quantum computation system having the desired properties (e.g., a given large number of qubits), even though such a system is not yet readily available, or not available at all.

SUMMARY OF THE INVENTION

A system and method for determining the result of a quantum operation included in a hybrid algorithm (e.g., an algorithm including quantum and classical processing instructions executed in concert) using a quantum virtual machine allows for classical processors to simulate quantum operations that would, otherwise, be executed on a quantum processing system. Herein a "quantum virtual machine" is a classical implementation of a "quantum abstract machine", such as the hybrid classical/quantum computing model described in the paper "*A Practical Quantum Instruction Set Architecture*," arXiv:1608.03355v2. The system determines whether or not to execute the hybrid algorithm using the quantum virtual machine based on the number of quantum operations and number of qubits included in the hybrid algorithm. The hybrid algorithm includes a quantum virtual state including a number of qubits (a virtual wavefunction). The system stores every possible combination of qubits in the virtual wavefunction as probability amplitudes in memory locations of a (shared) memory. The hybrid algorithm includes a quantum operation that acts on a subset of the qubits in the virtual wavefunction. The system simulates the hybrid algorithm using a classical processor by executing a classical representation of the quantum operation on the virtual wavefunction and manipulating the complex amplitudes stored in the memory locations.

To execute the algorithm, the system determines a number of virtual partial wavefunctions based on the number of qubits represented by the virtual wavefunction (total qubits) and the number of qubits the quantum operation acts on (acted-on qubits). The qubits that an operation acts on determines the Hilbert subsystem in which the wavefunction state is changed. The system also determines elements of the virtual partial wavefunctions and the order of the elements in the virtual partial wavefunctions based on the total qubits and acted-on qubits. Each element of a virtual partial wavefunction is a probability amplitude stored in a memory location. The system accesses the elements of each virtual wavefunction and applies a classical representation of the quantum operation by the virtual partial wavefunction. Each application yields a resulting virtual partial wavefunction including resulting complex amplitudes as the elements. Each resulting complex amplitude of the resulting virtual partial wavefunction is stored in a corresponding memory location of the shared memory. The system determines the result of the quantum operation based on the resulting complex amplitudes.

In a particular example, the system executes a quantum algorithm using a classical processing system to determine a result of the quantum algorithm. To do so the system receives the quantum algorithm from a client device. The quantum algorithm includes a quantum operation acting on at least one qubit of a virtual wavefunction. The virtual wavefunction includes a plurality of qubits, each combination of qubits of the virtual wavefunction represented by a complex amplitude stored at a memory location of the classical processing system.

The classical processing system instantiates a virtual quantum processing system on a datastore of the classical processing system. The virtual quantum processing system is configured to execute the quantum operation. To do so, the virtual quantum processing system, using classical processors, identifies a set of virtual partial wavefunctions based on the qubits the quantum operation acts on and the qubits of the virtual wavefunction. Each virtual partial wavefunction includes one or more complex amplitudes of the virtual wavefunction.

The virtual quantum processing system accesses the one or more complex amplitudes of each virtual partial wavefunction of the set of virtual partial wavefunctions from a corresponding memory location of the classical processing system. The virtual quantum processing system then executes the quantum operation on the accessed complex amplitudes for each virtual partial wavefunction of the set of virtual partial wavefunctions to determine resulting complex amplitudes. Here, the resulting complex amplitudes represent a state evolution of the virtual wavefunction.

The complex amplitudes are stored in the memory of the classical processing system. The virtual quantum processing system then determines the result of executing the quantum algorithm using the stored resulting complex amplitudes and provides the result of the quantum algorithm to the client device.

In an embodiment, the quantum operation is represented by a matrix stored in the classical processing system with a matrix size based on a number of the qubits of the virtual wavefunction that the quantum operation is acting on. In a particular example, the number of the qubits of the virtual wavefunction is k and the matrix size of the matrix representing the quantum operation is $2^k \times 2^k$.

In an embodiment, the virtual wavefunction is represented by a bitstring vector stored in the classical processing system with a bitstring vector size based on a number of qubits in the virtual wavefunction. In a particular example, the number of qubits in the virtual wavefunction is n and the bitstring vector size is $2^n$.

In an embodiment, the virtual partial wavefunctions is represented by a bitstring sub-vector with a sub-bitstring vector sized based on the number of qubits the quantum operation is acting on. In a particular example, the number of qubits the quantum operation is acting on is k and the sub-bitstring vector size is $2^k$.

In an embodiment, a number of virtual partial wavefunctions in the set of quantum bitstrings is based on the qubits the quantum operation acts on and the qubits of the virtual wavefunction. In a particular example, the number of qubits in the virtual wavefunction is n, the number of qubits the quantum operation acts on is k, and the number of virtual partial wavefunctions is $2^{n-k}$.

In an embodiment, executing the quantum operation includes multiplying a matrix representing the quantum operation and a set of sub-bitstring vectors representing the virtual partial wavefunctions, the matrix stored in the classical processing system having a matrix size based on a number of qubits the quantum operations acts on, and the sub-bitstring vectors having a vector sized based on the number of qubits the quantum operation acts on. In a particular example, the number of qubits the quantum operation acts on is k, the matrix size is $2^k \times 2^k$ the sub-bitstring vector size is $2^k$. Further executing the quantum algorithm includes multiplying the matrix representing the quantum operation with matrix size $2^k \times 2^k$ by the set of sub-bitstring vectors with sub-bitstring vector sizes $2^k$. In another particular example, the number of the virtual partial wavefunctions is based on the number of qubits the quantum operation acts on, and a number of qubits in the virtual wavefunction. In this example, the number of qubits the quantum operation acts on may be k, the number of qubits in the virtual wavefunction may be n, and the number of sub-bitstring vectors may be $2^{n-k}$. Here, executing the quantum algorithm comprises multiplying the matrix representing the quantum operation by the $2^{n-k}$ sub-bitstring vectors.

In an embodiment, the system may determine and execute a stochastic quantum operation to introduce stochastic errors in the virtual wavefunction when the quantum operation is executed such that the determined result includes stochastic error, the stochastic quantum operation being based on the quantum algorithm.

In an embodiment, the system may determine and execute a unitary quantum operation to introduce unitary errors in the virtual wavefunction when the quantum operation is executed such that the determined result includes unitary error, the unitary quantum operation being based on the quantum algorithm In an embodiment, the complex amplitudes of each combination of qubits in the virtual wavefunction are accessible by an alternate processor of the classical processing system. Further, the quantum operation may be executed on each virtual partial wavefunction of the set of quantum sub-bitstrings by separate processors of the classical processing system.

In an embodiment, determining the result of the quantum algorithm includes simulating a quantum measurement on at least one qubit of the virtual wavefunction based on the resulting complex amplitudes and a set of basis states for the quantum measurement.

In an embodiment, executing the quantum operation includes generating a set of machine instructions to execute the quantum operation on the set of virtual partial wavefunctions. The set of machine instructions may be executed by the classical processing system.

In an embodiment, the system determines, whether to instantiate the virtual quantum processing system based on the received quantum algorithm. In an example, the virtual quantum processing system is instantiated in response to a determination to simulate the virtual quantum processing system. Further, in an example, the determination to instantiate the virtual quantum processing system is based on a number of quantum operations included in the quantum algorithm. Finally, in an example, the determination to instantiate the virtual quantum processing is based on a number of the plurality of qubits included in the quantum algorithm.

In an embodiment, the virtual quantum processing system is an application downloadable from a remote network system via a network. In an embodiment, the client device is an application executing on a partition of the classical processing system. In an embodiment, the client device is the classical processing system.

In embodiment, the quantum operation is a density operator such as a Krauss operator. In this case, the virtual wavefunction comprising the plurality of qubits is a concatenated density matrix comprising a plurality of values representing a probability distribution.

In various other configurations, the system can introduce noise to the quantum operation, compile instructions to simulate a hybrid algorithm in real-time, access a library of matrices and vectors to simulate a hybrid algorithm, or generate more efficient classical machine instructions for simulating the hybrid algorithm on a classical processing system.

In various configurations, the system may include one or more processors. The processors may be located on a client system or a network system. In either case, the system includes a datastore storing a non-transitory computer-readable storage medium computer program code that, when executed by the one or more processors, cause the processors to execute the methods and processes described herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 7 is an illustration of a method for determining the result of a hybrid algorithm using a quantum virtual machine, according to one example embodiment.

FIGS. 8A-8F are a visual representation of determining the result of a hybrid algorithm using a quantum virtual machine, the hybrid algorithm including a four qubit virtual wavefunction and a quantum operation that acts on two qubits of the virtual wavefunction, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Quantum computations are fundamentally different from classical computations. Real world computing applications generally implement a hybridization of quantum and classical computations. Executing quantum computations efficiently requires a highly specific set of hardware and integrating the results of those quantum computations with classical systems can be challenging. In some cases, it can be beneficial to simulate a quantum computation on a classical processing system if executing the quantum operations on a quantum processing system is infeasible, expensive, inefficient and/or not fully optimized. Described herein as an example is a cloud quantum computing system that allows for the integration of quantum computations by classical processing systems and simulations of those quantum computations by classical processing systems. Further examples described herein include classical processing systems configured for simulation of quantum computations.

I. Qubits

Quantum algorithms, when executed, manipulate and read information stored in a qubit (i.e. qubit). A qubit is fundamentally different from a classical bit. A classical bit has two possible states, typically represented as a 0 or a 1. Ostensibly, a qubit also has two measurable outcomes which can likewise be represented as a 0 or a 1. However, more specifically, the state of a qubit is a superposition of the two measurable outcomes, i.e. some probability of a 0 state and some probability of a 1 state. Hence, a qubit can encode more information in its state than a classical bit.

The two measurable outcomes of a qubit are known as the basis states. The basis states can be written as $|0\rangle$ and $|1\rangle$. Accordingly, a qubit state is a linear superposition of the basis states. Thus, a qubit state $|\psi\rangle$ can be represented as a linear combination of $|0\rangle$ and $|1\rangle$: $|\psi\rangle = \alpha|0\rangle + \beta|1\rangle$, where $\alpha$ and $\beta$ are complex-valued probability amplitudes of the basis states. The complex-valued probability amplitudes can be defined as $|\alpha|^2 = Pr(|0\rangle)$, $|\beta|^2 = Pr(|1\rangle)$, and $|\alpha|^2 + |\beta|^2 = 1$. Thus, each qubit is a combination over these complex values.

Figures 1A, 1B, 1C, 1D, 1E:
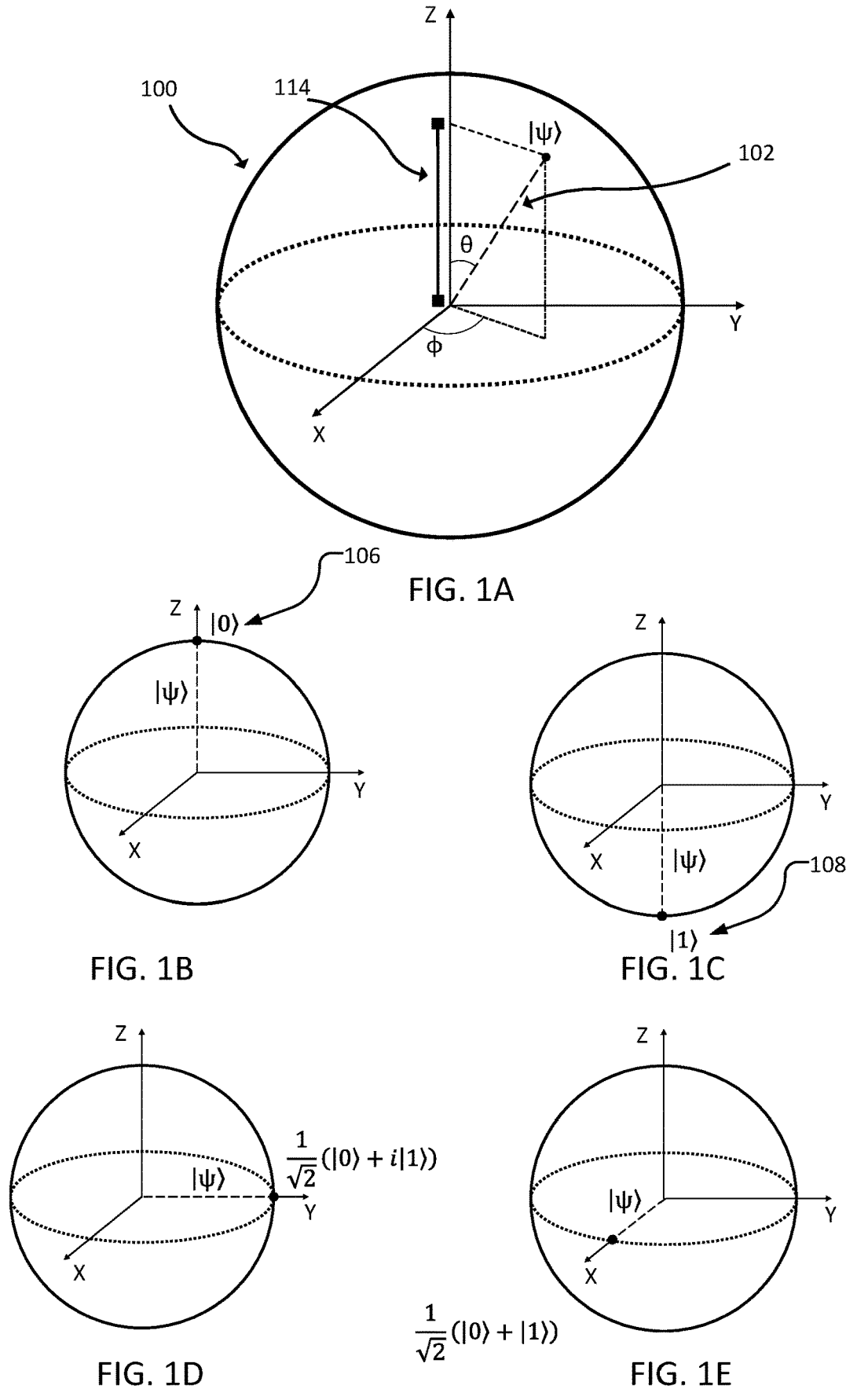
FIG. 1A-1E are illustrations of qubit states represented on a Bloch sphere.

As a visual aid, FIG. 1 is an illustration of the possible states for a single qubit $|\psi\rangle$ 102 using a Bloch sphere 100. On this sphere 100, a classical bit can only be represented at the "north pole" or the "south pole" of the sphere (e.g., the Z axis). As seen in FIG. 1B and FIG. 1C, these poles are the visual representation of the basis state $|0\rangle$ 106 and the basis state $|1\rangle$ 108 on the Bloch sphere 100. Unlike a classical bit, a qubit state can be represented by any point on the surface of the Bloch sphere. For example, the qubit state $|\psi\rangle$ of FIG. 1D can be represented as $|\psi\rangle = (1/\sqrt{2})(|0\rangle + i|1\rangle)$, and the qubit state $|\psi\rangle$ of FIG. 1E can be represented as $|\psi\rangle = (1/\sqrt{2})(|0\rangle + |1\rangle)$.

Measurement of a qubit state is a measurement of the basis states $|0\rangle$ and $|1\rangle$ with probabilities $|\alpha|^2$ and $|\beta|^2$, respectively. Generally, direct measurement of the qubit alters the values of $\alpha$ and $\beta$. Referring to FIG. 1, a measurement of a qubit state measures the projection of the qubit state (e.g., projection 114 of qubit 102) along an axis of the Bloch sphere (e.g., the vertical axis). That is, a measurement of a quantum state at any point during execution of a hybrid algorithm is a measurement of the probabilities of the complex amplitudes.

Another dissimilarity between a qubit and a classical bit is that multiple qubits can demonstrate quantum entanglement. Quantum entanglement allows a qubit state to express correlation between a set of qubit states that is more difficult or not possible between classical bits. As an example, the qubit state of two entangled qubits is most generally expressed as $|\psi\rangle = \gamma_{00}|00\rangle + \gamma_{01}|01\rangle + \gamma_{10}|10\rangle + \gamma_{11}|11\rangle$ where the $\gamma$ values are the probability amplitudes of the entangled states. Thus, multiple qubits can store an exponentially larger amount of information in their states than the equivalent number of classical bits.

Generally, quantum algorithms are executed on a quantum computation system to encode information into a qubit (or group of qubits) state, manipulate the state, and measure the state. In many cases, quantum processing systems introduce errors when executing a quantum algorithm and reducing or accommodating those errors is necessary to determine an accurate result of the quantum algorithm.

II. Cloud Based Quantum Computing System

Figure 2:
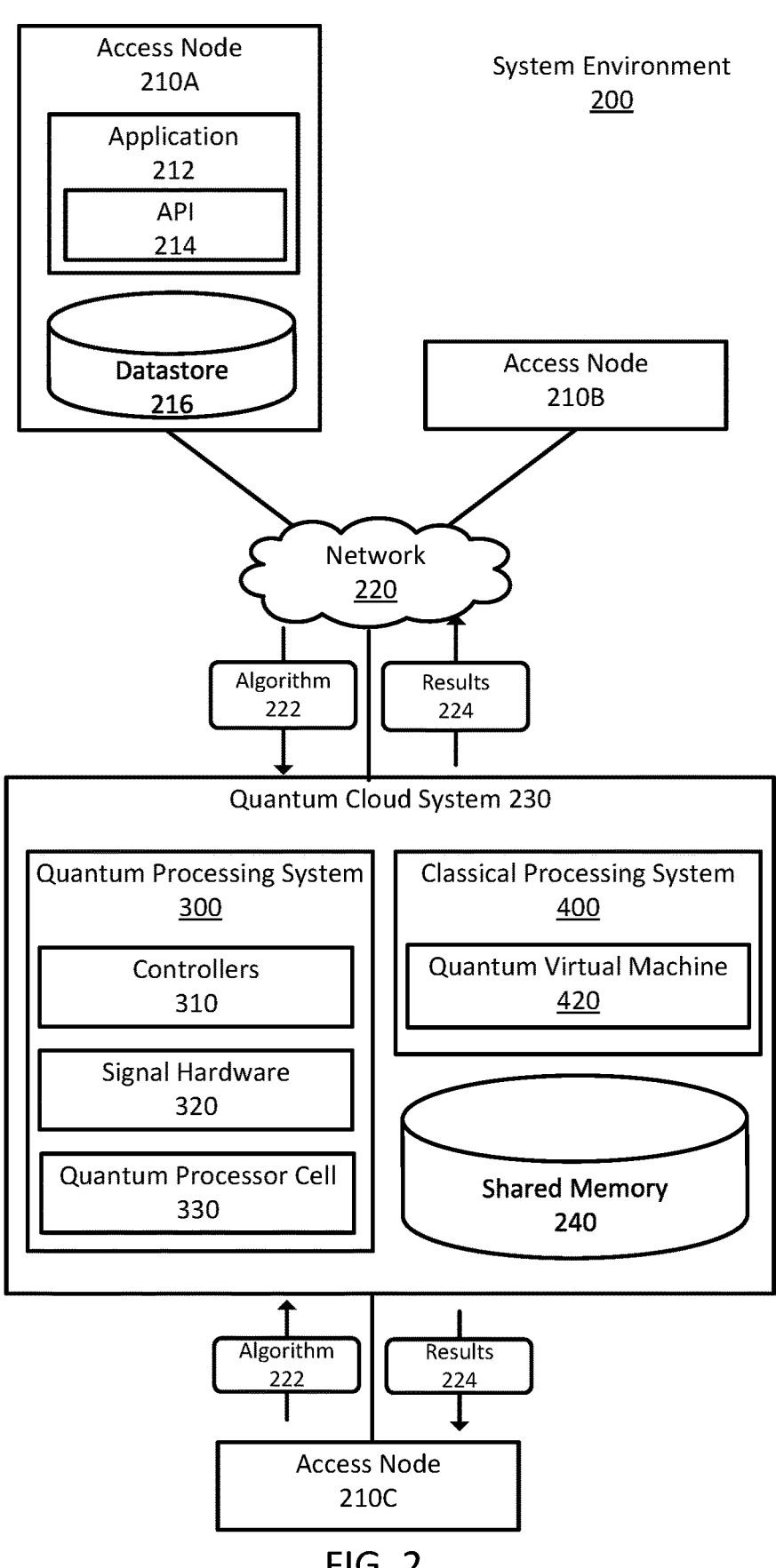
FIG. 2 is an illustration of a cloud quantum computing system, according to one example embodiment.

Execution of quantum algorithms via a quantum computation system requires a complex set of computational hardware that is typically inaccessible to the general population. However, the described computing environment allows for the remote control and execution of quantum algorithms using a network based quantum computation system. As an example, FIG. 2 is a block diagram of a system environment 200 for a quantum computation system, such as quantum cloud system 230, which can provide the results of quantum computations to access nodes remote from the quantum cloud system 230. The system environment 200 of FIG. 2 includes access nodes 210 (210A, 210B & 210C), a network 220, and a quantum cloud system 230. Alternate embodiments of the system environment can include any number of access nodes 210 and quantum cloud systems 230. The functions performed by the various entities of FIG. 2 may vary in different embodiments.

Within the context of the environment 200 of FIG. 2, a user of an access node 210 generates a set of quantum calculation instructions using an application 212 executing on the access node 210. In some embodiments, the quantum calculation instructions can be written in a defined quantum instruction language (e.g., Quil, See "*A Practical Quantum Instruction Set Architecture,*" arXiv:1608.03355v2) as a quantum algorithm (e.g., algorithm 222). A quantum algorithm can include any computer executable representation of quantum instructions, a series of quantum computations, hardware commands, software commands, programs, or control signals. Additionally, a quantum algorithm 222 can additionally include any number of classical calculation instructions.

The implementation or execution of the quantum algorithm 222 by the quantum cloud system 230 includes the determination of at least one result (e.g., result 224) of a quantum operation (e.g., reading a qubit or multiple qubits). The access node 210 transmits the quantum algorithm 222 to the quantum cloud system 230. The quantum cloud system 230 receives the quantum algorithm 222, schedules instructions of the quantum algorithm 222 on the quantum cloud system 230, and executes the quantum algorithm 222 on the quantum cloud system 230. The quantum cloud system 230 determines the result 224 of the quantum algorithm 222 by executing the quantum algorithm 222 using the classical processing system 400 and the quantum processing system 300 (or any combination of the systems). In various other embodiments, the quantum cloud system 230 can access any other computational resource to execute the quantum algorithm 222 (e.g., a supercomputer or other high-performing computer resource). In some embodiments, the quantum algorithm 222 is executed by a quantum virtual machine 420, which simulates the native execution of the algorithm by the quantum processing system 300 through operations performed purely by the classical processing system 400. The quantum cloud system 230 transmits the determined result 224 of the quantum algorithm 222 to an access node 210. A detailed example of a quantum algorithm 222, its execution within using a quantum processing system 300, and measuring a result 224, is described in Section VII, below.

This hybridization of classical processing and quantum processing allows for direct integration of quantum computations and classical computations into a familiar classical computer program framework.

Quantum cloud system 230 can receive any number of quantum algorithms 222 from any number of access nodes 210 in the environment. Additionally, the quantum cloud system 230 includes functionality to execute quantum algorithms 222 received from disparate access nodes 210 such that the quantum algorithms 222 are executed efficiently.

In the environment of FIG. 2, access nodes 210 are any device that can access the functionality of the quantum cloud system 230. In some configurations, access nodes 210 are classical computing devices adapted to execute classical computer programs (e.g. access node 210A). A typical access node 210 can be a lap-top computer, tablet, or cell-phone, or any other client device. The access nodes 210 include software applications, such as application 212, which execute on the processor of the respective access node 210. In one example, the application 212 can be a programming application, such as a compiler and/or integrated development environment, configured to program quantum processing systems. Application 212 can generate a quantum algorithm 222 for determining the result of a quantum calculation on the quantum cloud system 230. Thus, access nodes 210 generate a quantum algorithm 222 that uses quantum calculations in the context of classical application 212.

In various embodiments, applications 212 can be a web browser, a word processor, a networking application, a messaging application, etc. In some embodiments, each application 212 can be linked to a user account on the quantum cloud system 230 associated with an access node 210, an access node user, or group of access node users. Applications 212 of disparate access nodes 210 can communicate with one another and with quantum cloud system 230 via network 220.

In some cases, application 212 uses an application programming interface (API) 214 to communicate with the quantum cloud system 230 through the network 220. The API can expose the application to a quantum machine instruction library. The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by quantum algorithms 222. In some examples, the API 214 is configured to allow the application 212 to generate quantum algorithms 222 that control both the classical processing system and quantum processing system using the quantum machine instruction library.

Additionally, access nodes 210 can include an access node datastore 216. The access node datastore 216 contains information associated with the access node user, the access node 210, a user account, application 212, and application-specific data (i.e., data and variables used by or related to quantum algorithms 222). This information can be accessed by the application 212 when generating or transmitting a quantum algorithm 222 to the quantum cloud system 230. In one embodiment, the information can be used to build, store, modify, or update user profiles. The information stored in the access node datastore 216 can include: inter-node security metrics, intra-node security metrics, network security metrics, authentication protocols, user account information and preferences, access node information and preferences, access node user information and preferences, a record of preferences and changes, location based information, identities of applications or other application information executing on an access node, and any other information associated with executing quantum algorithms 222 in the environment 200. In some embodiments, an access node can store a local copy of the quantum machine instruction library in access node datastore 216.

Access nodes 210 communicate with the quantum cloud system 230 via the network 220, which may include any combination of local area and wide area networks employing wired or wireless communication links. In some embodiments, all or some of the communication on the network 220 may be encrypted or subject to security settings within the environment. In some examples, an access node 210 (e.g., access node 210C) can be directly connected to and communicate directly with quantum cloud system 230.

The quantum cloud system 230 receives, interprets, and executes quantum algorithms 222 from an access node 220. In some examples, a user generates the quantum algorithm 222 on an access node 210 and transmits the quantum algorithm 222 to the quantum cloud system 230. After execution, the quantum cloud system transmits the result 224 of the quantum algorithm 222 to the access node 210. In the example embodiment of FIG. 2, the quantum cloud system 230 includes a quantum processing system 300, a classical processing system 400, and a shared memory 240. The quantum processing system includes controllers 310, signal hardware 320, and a quantum processing cell 330.

The quantum cloud system 230 includes a number of systems and modules, which refers to hardware components and/or computational logic for providing the specified functionality. That is, a system or module can be implemented in hardware elements, firmware, and/or software (e.g., a hardware server comprising computational logic, or computer storage medium comprising computational logic). Other embodiments can include additional systems and modules, can distribute functionality between systems and modules, and can attribute functionality to more or fewer systems or modules. Note that, in general, quantum processing systems and modules require specialty quantum hardware systems as described herein. Further, some modules of the quantum cloud system 230 are designed for control of the specialty quantum hardware systems.

Quantum cloud system 230 includes a classical processing system 400. The classical processing system 400 is described in more detail with reference to FIG. 4. The classical processing system 400 receives a quantum algorithm 222 from an access node 210 and generates a set of algorithm instructions to determine the result of the quantum algorithm 222. The quantum cloud system 230 executes the algorithm instructions to determine the result 224 of the quantum algorithm 222 and returns the result 224 of the quantum algorithm 222 to the access node 210. In one embodiment, the classical processing system 400 determines the set of algorithm instructions based on the quantum instruction language (e.g., Quil) of the received quantum algorithm and the quantum machine instruction library.

Because the quantum algorithm is executing on quantum cloud system 230, which includes both classical and quantum systems, the set of algorithm instructions can likewise include both classical instructions and quantum instructions. Accordingly, the quantum algorithm can be viewed as a quantum/classical algorithm (i.e., a "hybrid algorithm"). The classical instructions are instructions of the hybrid algorithm that execute on the classical processing system 400. Similarly, the quantum instructions are instructions of the hybrid algorithm that execute on the quantum processing system 300. In some embodiments, the quantum instructions are alternatively executed in the quantum virtual machine 420, rather than on the quantum processing system 300.

Algorithm instructions can be scheduled for execution by the quantum cloud system 230 in a variety of manners. Instruction scheduling is a process that determines which instructions are executed on which resources at which times. As a basic example, the classical processing system 400 may schedule two classical instructions on the classical processing system 400 and a single quantum instruction on the quantum processing system 300, and two synchronous quantum instructions on the quantum processing system 300, etc. In another embodiment, the classical processing system 400 directly schedules the quantum instructions on the quantum processing system 300. In another embodiment, executing a classical instruction initiates the scheduling and execution of a quantum instruction on the quantum processing system 300.

Further, the scheduled algorithm instructions can be executed by the quantum cloud system 230 in a variety of manners. Using the previous example, the quantum cloud system 230 may execute the two classical instructions, then the quantum instruction, then the three classical instructions, etc. In some embodiments, the algorithm instructions are executed based on a system clock of the quantum cloud system (e.g., each instruction executes at a specific time). In another embodiment, the algorithm instructions execute sequentially (e.g., a first instruction, a second instruction, etc.). In another embodiment, the classical processing system 400 can schedule classical and quantum operations, or multiple quantum operations, to execute simultaneously on their respective systems.

Whatever the embodiment, the classical processing system 400 may schedule algorithm instructions in any manner, consistent with some known or desired semantics, across any of the systems and modules of the quantum cloud system 230 such that, when executed, the algorithm instructions determine the result of the quantum algorithm.

Classical processing system 400 includes a quantum virtual machine (QVM) 420 capable of simulating quantum operations on a classical system. The QVM 420 receives a hybrid algorithm including a classical state, a quantum state, and hybrid quantum-classical operations; in some embodiments the QVM could also use sparse representation. The QVM 420 represents the quantum state as a set of probability amplitudes stored in memory locations of the shared memory. The probability amplitudes are a complex number representing the probability of measuring a particular state of the quantum state in the measurement basis. The QVM 420 executes the quantum operations by manipulating both the shared memory and the probability amplitudes based on the characteristics of the quantum state and the hybrid quantum operations. The QVM 420 determines the result of the hybrid algorithm by simulating a measurement of the quantum state. In various configurations, the QVM 420 can perform "just in time" compilations, share the memory addresses that contain the classical representation of the quantum state, introduce error to the quantum state, or evolve the quantum state using the Feynman formalism.

In various embodiments, the QVM 420 may be instantiated on the classical processing system in different manners. For example, the QVM 420 (i) may be an application installed on a datastore of the quantum cloud system 230, (ii) an application executing on a partition of the quantum cloud system 230 and/or an access node 210, and (iii) an application installed on an access node 210 or client device, etc. When installed on an access node 210 or partition, the QVM 420 may be downloaded from a network system (e.g., quantum cloud system 230) via the network 220.

Quantum cloud system 230 includes a quantum processing system 300. The quantum processing system 300 is described in more detail with reference to FIG. 3. The quantum processing system 300 is configured to execute quantum operations to facilitate determining the result of the quantum algorithm. For example, the quantum processing system receives scheduled quantum instructions from the classical processing system 400 and executes the quantum instructions. In another example, the quantum processing system 300 receives and executes a quantum instruction as a result of the classical processing system 400 executing a classical instruction. In some cases, the quantum processing system stores the result of the quantum computation in the shared memory 240. In some embodiments, the quantum processing system 300 returns the result of the quantum computation to the classical processing system 400.

The shared memory 240 stores information that can be used by any system or module of the quantum cloud system 230 to facilitate determining the result of a quantum algorithm (e.g., the quantum processing system 300 and the classical processing system 400). In a particular example, the shared memory 240 stores the result of executed quantum computations (e.g., qubit measurements) by the quantum processing system 300, which are then directly accessible by the classical processing system 400. As noted above, the algorithm instructions can include information stored in the shared memory 240 of the quantum cloud system 230. For example, the shared memory 240 can store a rotation angle as an input parameter that a quantum instruction can access and apply to a qubit when executing. As another example, the shared memory 240 can store the results of two previously executed quantum operations which a classical instruction can perform arithmetic on using the classical processing system 400. In some embodiments, the shared memory 240 stores probability amplitudes for a quantum virtual state used by the QVM 420. The probability amplitudes can be accessed at any time by elements of the quantum cloud system 230.

Providing a more contextual example of the environment 200, consider a researcher working to understand the dynamics of protein folding in a biological environment. The researcher generates computer code modeling protein folding using a hybrid classical/quantum algorithm including several classical and quantum calculations. The code is generated on a client device 210 using an application 212 with an installed API 214 configured to generate code using a quantum programming language, such as the Quil programming language. The researcher transmits the code to the quantum cloud system 230 via the network 220.

The quantum cloud system 230 receives the code and the classical processing system 400 generates a set of algorithm instructions, including both classical instructions and quantum instructions, based on the code. The classical processing system 400 then schedules the algorithm instructions such that the result of the code can be determined. For example, the classical processing system 400 schedules the classical operations on the classical processing system 400, and the remainder of the quantum instructions on the quantum processing system 300. In this example, the quantum processing system 300 executes the quantum instructions and stores the result in the shared memory 240.

In aggregate, the algorithm instructions executed across the systems and modules of the quantum cloud system 230 determine a result to the protein folding code. Once determined, the quantum cloud system 230 transmits the result to the client device 210 via the network 220. The graduate student researcher celebrates the computation and completion of such a complex problem.

III. Quantum Processing System

Figure 3:
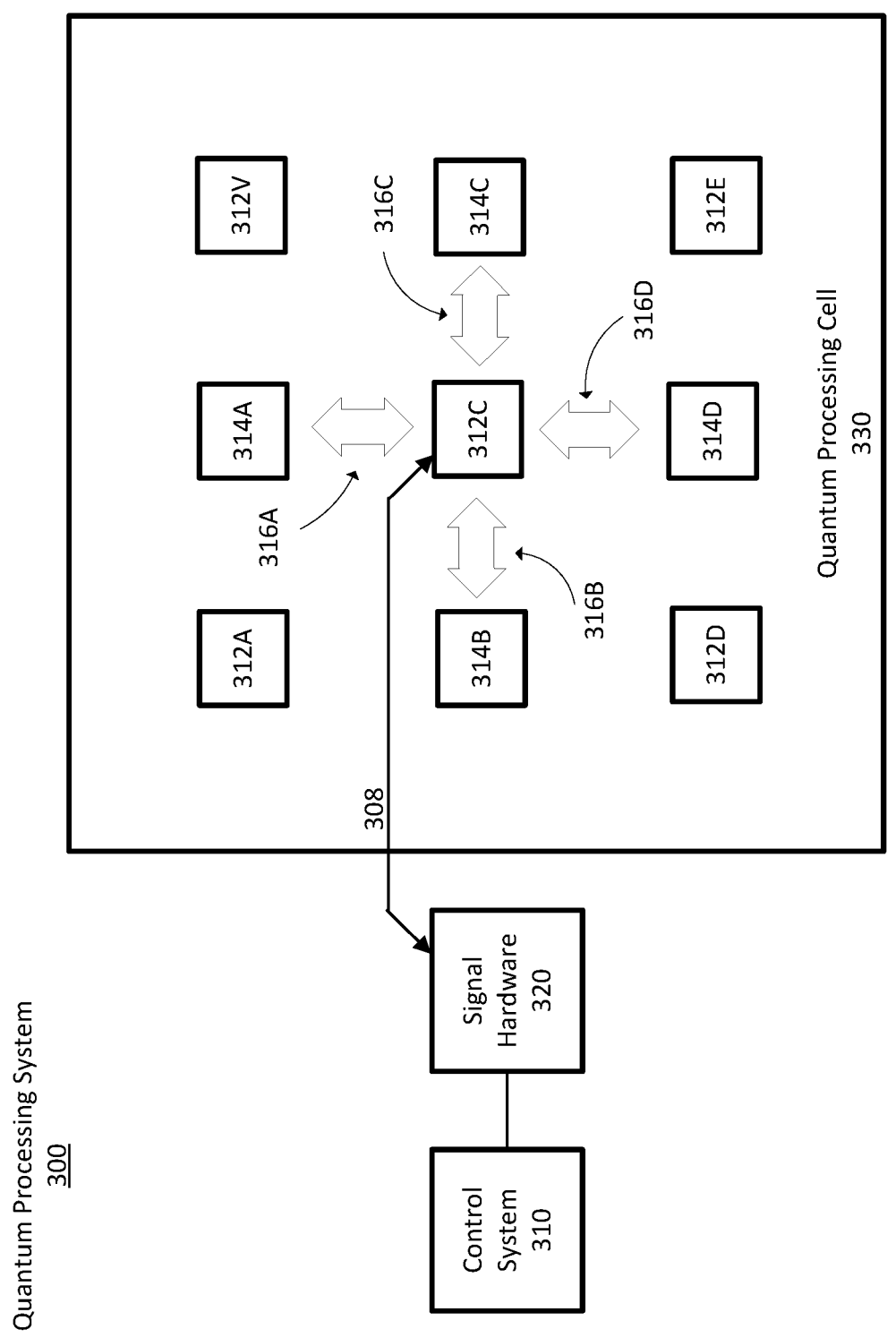
FIG. 3 is an illustration of a quantum processing system, according to one example embodiment.

FIG. 3 is a block diagram showing devices and interactions in an example quantum processing system 300 of the quantum cloud system 230. As shown in FIG. 3, the example quantum processing system 300 includes control system 310, signaling hardware 320, and a quantum processing cell 330. The quantum processing system 300 may include additional or different features, and the components may be arranged differently from the arrangement described herein.

The example quantum processing cell 330 includes a qubit device array, which includes qubit devices arranged in a two-dimensional or three-dimensional lattice structure. In various other embodiments, the qubits may be arranged in any interconnected structure. Nine of the devices in the qubit device array are shown in FIG. 3. In particular, FIG. 3 shows five tunable qubit devices 312 (312A, 312C, 312D, 312E & 312V) and four other qubit devices 314 (314A, 314B, 314C & 314D). In some examples, the tunable qubit devices are implemented as tunable transmon qubit devices, flux qubit devices, flatsonium qubit devices, fluxonium qubit devices, or other types of tunable devices. In some examples, the other qubit devices 314 are also implemented as tunable qubit devices. In some examples, the other qubit devices 314 are implemented as fixed-frequency qubit devices. For instance, other qubit devices 314 may be implemented as fixed-frequency transmon devices or other types of fixed-frequency qubit devices. The devices shown in FIG. 3 may be implemented by other types of devices or components. As an example, one or more of the qubit devices shown in FIG. 3 may be implemented as a resonator device, a coupler device, or otherwise.

In some instances, all or part of the quantum processing cell 330 functions as a quantum processor, a quantum memory, or another type of subsystem. In some examples, the quantum processor includes a quantum circuit system. The quantum circuit system may include qubit devices, resonator devices and possibly other devices that are used to store and process quantum information. In some cases, the quantum processor includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor. In some cases, the quantum processor includes an ion trap system, and the qubit devices are implemented as trapped ions controlled by optical signals delivered to the quantum processor. In some cases, the quantum processor includes a spin system, and the qubit devices are implemented as nuclear or electron spins controlled by microwave or radio-frequency signals delivered to the quantum processor. The quantum processor may be implemented based on another physical modality of quantum computing.

In the example shown in FIG. 3, the devices are arranged in a rectilinear (e.g., rectangular or square) array that extends in two spatial dimensions, and each qubit device has up to four nearest-neighbor qubit devices. In some implementations, the devices can be arranged in another type of array (e.g., an ordered hexagonal array, an unordered random array, etc.). In some instances, the rectilinear array also extends in a third spatial dimension to form a cubic array or another type of three-dimensional array. In some configurations, a third spatial dimension can also include components configured for signal delivery. Signal delivery in the third dimension can allow non-proximally located qubits to interact. More broadly, the quantum processing cell 330 may include additional devices, including additional qubit devices, readout resonators, on chip parametric amplifiers, any type of interconnects, superconducting vias, etc.

In some implementations, the quantum processing cell 330 can process quantum information by applying control signals (e.g., signals 308) to the qubits (e.g., qubits 312 and 314) in the quantum processing cell 300. The control signals 308 can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

Signal hardware 320 includes components that communicate with the quantum processing cell 330. The signal hardware 320 may include, for example, waveform generators, amplifiers, digitizers, high-frequency sources, DC sources, AC sources and other type of components. The signal hardware may include additional or different features and components. In the example shown, components of the signal hardware 320 are adapted to interact with the quantum processing cell 330. For example, the signal hardware 320 can be configured to operate in a particular frequency range, configured to generate and process signals in a particular format, or the hardware may be adapted in another manner.

In some instances, one or more components of the signal hardware 320 generate signals 308, for example, based on control information from control system 310. The signals can be delivered to the quantum processing cell 330 to operate the quantum processor system 300. For instance, the signal hardware 320 may generate signals 308 to implement quantum logic operations, readout operations or other types of operations. As an example, the signal hardware 320 may include arbitrary waveform generators (AWGs) that generate electromagnetic waveforms (e.g., microwave or radio-frequency) or laser systems that generate optical waveforms. The waveforms or other types of signals 308 generated by the signal hardware 320 can be delivered to devices in the quantum processing cell 330 to operate qubit devices, readout devices, bias devices, coupler devices or other types of components in the quantum processing cell 330.

In some instances, the signal hardware 320 receives and processes signals from the quantum processing cell 330. The received signals can be generated by operation of the quantum processing system 300. For instance, the signal hardware 320 may receive signals 308 from the devices in the quantum processing cell 330 in response to readout or other operations performed by the quantum processing cell 330. Signals 308 received from the quantum processing cell 330 can be mixed, digitized, filtered, or otherwise processed by the signal hardware 320 to extract information, and the information extracted can be provided to the control system 310 or handled in another manner. In some examples, the signal hardware 320 may include a digitizer that digitizes electromagnetic waveforms (e.g., microwave or radio-frequency) or optical signals, and a digitized waveform can be delivered to the control system 310 or to other signal hardware components. In some instances, the control system 310 processes the information from the signal hardware 320 and provides feedback to the signal hardware 320; based on the feedback, the signal hardware 320 can in turn generate new control signals that are delivered to the quantum processing cell 330.

In some implementations, the signal hardware 320 includes signal delivery hardware that interfaces with the quantum processing cell 330. For example, the signal hardware 320 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing cell 330. In some instances, signal delivery hardware performs preprocessing, signal conditioning or other operations on readout signals received from the quantum processing cell 330.

Control system 310 communicates with the signal hardware 320 to control operation of the quantum processing system 300. The control system 310 may include digital computing hardware that directly interface with components of the signal hardware 320. In various embodiments, the control system can include features similar to classical processing system 400. That is, control system 310 may include processors, memory, clocks and other types of systems or subsystems.

Generally, the control system 310 can interpret the quantum instructions generated by classical processing system 400 and generate hardware-specific control sequences configured to execute the operations prescribed by the quantum machine instructions. For example, the control system 310 may generate control information that is delivered to the signal hardware 320 and converted to control signals that control the quantum processor cell 330.

Control system 310 can include one or more clocks that can assist in scheduling quantum operations. For example, operations performed by the control system 310 may be scheduled for execution over a series of clock cycles, and clock signals from one or more clocks can be used to control the relative timing of each operation or groups of operations. In some cases, the control system 310 schedules control operations according to quantum instructions generated from a quantum (or hybrid) algorithm, and the control information is delivered to the signal hardware 320 according to the schedule in response to clock signals from a clock or other timing system.

In some embodiments, control system 310 can execute classical computer program instructions (e.g., instructions formatted as software, firmware, or otherwise). For example, the control system 310 may execute a quantum processor unit 330 (QPU) driver software, which may include machine code compiled from any type of programming language (e.g., Python, C++, Common Lisp, etc.) or instructions in another format. In some cases, QPU driver software receives quantum instructions (e.g., based on information from the cloud quantum computing system 230) and quantum state information (e.g., based on information from the signal hardware 320), and generates control signals and sequences for the quantum processing cell 330 based on the quantum machine instructions and quantum state information.

Control system 310 generates control information (e.g., a digital waveform) that is delivered to the signal hardware 320 and converted to control signals 308 (e.g., analog waveforms) for delivery to the quantum processing cell 330. The digital control information can be generated based on quantum instructions, for example, to execute quantum logic operations, readout operations, or other types of control.

Control system 310 extracts qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 320, digitize the qubit readout signals, and extract qubit state information from the digitized signals.

In some implementations, the quantum processing system 300 can span multiple different temperature and noise regimes. For example, the signaling hardware 320 can include a series of temperature stages (e.g., 60 K, 3 K, 350 mK, 300 mK, 5 mK) that decrease between a higher temperature regime of the control system 310 and a lower temperature regime of the quantum processing cell 330. The quantum processing cell 330, and in some cases all or part of the signaling hardware 320, can be maintained in a controlled cryogenic environment. In some examples, the cryogenic environment can be provided, by shielding equipment, cryogenic equipment, and other types of environmental control systems.

In some implementations, the tunable qubit devices 312 are housed between neighboring pairs of the other qubit devices 314 in a device array within the quantum processing cell 330. The quantum states of the respective qubit devices can be manipulated by control signals or read by readout signals generated by the control system 310 and signaling hardware 320. The qubit devices can be controlled individually, for example, by delivering control signals 308 to the respective qubit devices. In some cases, a neighboring pair of qubit devices (e.g., tunable qubit device 312C and other qubit device 314A) is controlled jointly by delivering control signals to the tunable qubit device. In some cases, readout devices can detect the states of the qubit devices, for example, by interacting directly with the respective qubit devices.

In the example shown in FIG. 3, each tunable qubit device 312 has one or more tunable transition frequencies. The transition frequency is the energy level between any two adjacent energy levels in a qubit device. The transition frequency of a qubit device is tunable, for example, by application of an offset field. In particular, the transition frequencies of the tunable qubit devices 312 can be tuned by applying an offset field to the tunable qubit device. The offset field can be, for example, a magnetic flux bias, a DC electrical voltage, AC electrical voltage or another type of field. In some implementations, the tunability of the tunable qubit devices 312 in the quantum processing cell 330 allows neighboring pairs of qubits to be selectively coupled ondemand to perform multi-qubit gates, to entangle neighboring pairs of qubits, or to perform other types of operations. The tunable qubit devices can have a high "on/off" ratio, which refers to the ratio of the effective coupling rate provided by control of the tunable qubit device. In one embodiment, each tunable qubit device can include a superconducting circuit loop including two Josephson junctions and a capacitor structure in parallel with the junctions.

In some implementations, the other qubit devices 314 are implemented as fixed frequency qubit devices. In one embodiment, a fixed frequency qubit device includes a Josephson junction connected in parallel with a capacitor structure. In this example, the transition frequency of a fixed-frequency qubit device is based in part on the Josephson energy of the junction. In some implementations, the coupling of a fixed-frequency qubit device with neighboring fixed-frequency qubit devices allows multi-qubit gate operations to be performed. In this implementation, the frequency of the qubit is not tunable with an offset field, and the qubit devices are less sensitive to low frequency flux noise, yielding improved longer coherence times.

IV. Quantum Computation

In the example quantum processing cell 330 each of the qubit devices can be encoded with a single bit of quantum information. As described in regards to FIG. 1, each of the qubit devices has two eigenstates that are used as basis states $|0\rangle$ and $|1\rangle$, and each qubit device can transition between the basis states or exist in an arbitrary superposition of the basis states. Generally, the two lowest energy levels (the ground state and first excited state) of each qubit device are defined as a qubit and used as basis states for quantum computation. In some examples, higher energy levels (e.g., a second excited state or a third excited state) are also defined by a qubit device and may be used for quantum computation in some instances.

In some instances, the information encoded in the qubit devices of the quantum processing cell 330 can be processed by operation of the tunable qubit devices 312. For instance, input information can be encoded in the computational states or computational subsystems defined by some or all of the qubit devices in the quantum processing cell 330. The information can be processed, for example, by applying a quantum algorithm or other operations to the input information. The quantum algorithm may be decomposed as gates or instruction sets that are performed by the qubit devices over a series of clock cycles. For instance, a quantum algorithm may be executed by a combination of single-qubit gates and two-qubit gates. In some cases, information is processed in another manner. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations. In some aspects of operation, the control system 310 sends control signals 308 to the tunable qubit devices in the quantum processing cell 330 using the signaling hardware 320. The control signals can be configured to modulate, increase, decrease, or otherwise manipulate the transition frequencies of the tunable qubit devices 312.

In the example shown in FIG. 3, the control system 310 sends control signals 308 to the tunable qubit device 312C to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

V. Quantum Gates

As described previously, quantum algorithms include a set of quantum instructions (e.g. computations) that can be executed by the quantum cloud system. Broadly, a quantum instruction can alter the state of a qubit, encode the state of a qubit, measure the state of a qubit, etc. Within the context of this description, a quantum computation (e.g., those generated from a quantum algorithm) is executed by applying a quantum gate to a qubit or performing a measurement. Quantum gates are the building blocks of the quantum algorithm and function similarly to logic gates in traditional computation systems and algorithms.

In practical terms, applying a quantum gate entails sending a specific set of signals for superconducting qubits to the control hardware of a qubit which induces a change in the state of the qubit. In one example embodiment, the control signals are configured to generate interactions that apply quantum gates on the quantum states (e.g., change, measure, etc.) of one or more of the qubit devices. For example, referring to FIG. 3, one or more of the control signals 308 generates an interaction that applies a parametrically activated two-qubit quantum gate to a pair of qubits defined by the tunable qubit device 312C and one or more of the other qubit devices 314. The control signals 308 may activate quantum gates by modulating a transition frequency of the tunable qubit device 312C, for example, at a modulation frequency. For instance, the modulation of the transition frequency over a specified time period can produce the unitary evolution associated with the quantum gate.

Quantum gates can act on any number of qubits. For example, a swap quantum gate acts on two qubits and swaps the state information of the two qubits. Additionally, some two qubit gates are considered controlled gates. In controlled gates, the state of one of the qubits being acted on acts as a control for the quantum operation. Controlled gates are generally used to generate entangled qubits.

As a practical example of a multi-qubit quantum gate, again referring to FIG. 3, the control system 310 sends control signals 308 to the tunable qubit device 312C via the signaling hardware to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

As previously described, quantum instructions generated from a quantum algorithm 222 can include instructions to apply a quantum gate (or series of quantum gates) on the qubits of the quantum processor 300. In some configurations, the quantum instructions can include additional information to facilitate the application of a quantum gate to a qubit. Thus, the quantum instructions can be represented most generally by G (k)=R, where G is the executed quantum instruction (e.g., quantum gate(s)), k is a set of information (or parameters) associated with the quantum instruction to facilitate its execution, and R is the result of the quantum computation. In some configurations, the set of information k can include the location of the qubit on the quantum processor, timing instructions for the execution of the quantum computation, control signal information for applying the quantum gate, information from the shared memory for executing the quantum computation, etc. Additionally, in some configurations, the result R of the quantum computation can include changing the state of the qubit, changing the position of the qubit on the quantum processor, measuring the state of the qubit, maintaining the state of the qubit, erasing the qubit, etc.

VI. Classical Processing System

Figure 4:
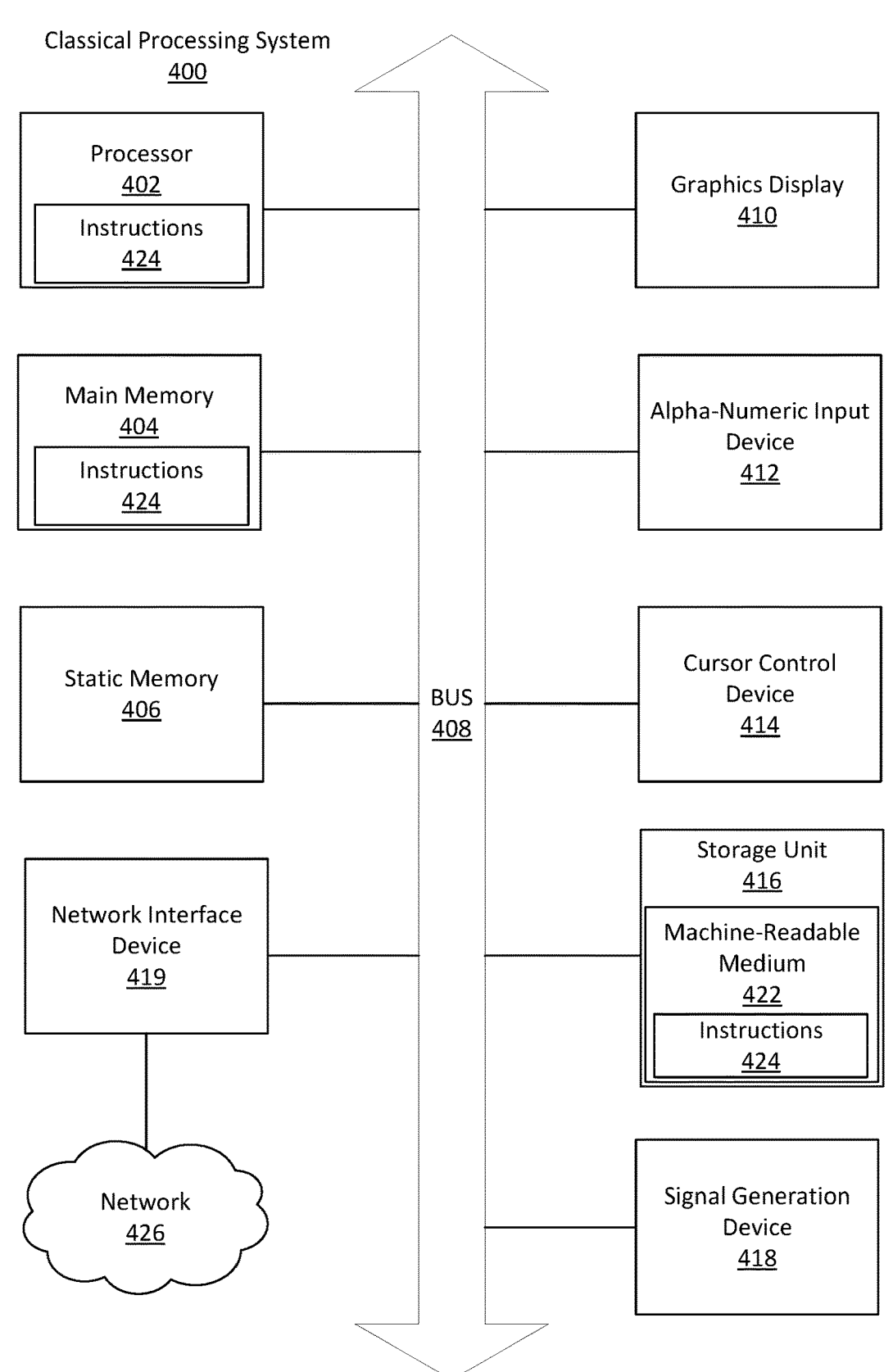
FIG. 4 is an illustration of a classical processing system, according to one example embodiment.

FIG. 4 is a block diagram illustrating components of an example classical processing system 400 that facilitates determining the result of a quantum algorithm in the quantum cloud system of FIG. 2. Additionally, the classical processing system 400 is capable of reading and executing instructions from a machine-readable medium.

As an example, FIG. 4 shows a diagrammatic representation of the classical processing system 400 of FIG. 2. The classical processing system can generate algorithm instructions using the classical processors 402. Further, the classical processing system 400 can be used to execute classical instructions 424 of the algorithm instructions. In alternative embodiments, the classical processing system 400 operates as a standalone device or a connected (e.g., networked) device that connects to the network system. In the illustrated embodiment, the classical processing system may be a server computer, capable of executing the classical instructions 424 (sequential or otherwise) that specify actions to be taken by the classical processing system 400 to determine the result of the quantum algorithm. In some examples, the classical processing system 400 may be a non-uniform memory architecture, a distributed machine like a supercomputer, or some other high-fidelity distributed computing environment.

The example classical processing system 400 includes one or more processing units (hereinafter referred to as processor 402). The processor 402 is, for example, a central processing unit (CPU), a graphics processing unit (GPU), a digital signal processor (DSP), a controller, a state machine, one or more application specific integrated circuits (ASICs), a field programmable gate array (FPGA), one or more radio-frequency integrated circuits (RFICs), or any combination of these. The processors 402 can generate control information, for example, based on the determined algorithm instructions (e.g., a set of quantum gates, offset field signals, quantum simulation parameters, etc.) to be performed by the quantum computing system 300.

The classical processing system 400 also includes a main memory 404. The computer system may include a storage unit 416. The processor 402, memory 404, and the storage unit 416 communicate via a bus 408. In addition, the computer processing system 400 can include a static memory 406.

Additionally, the classical processing system 400 includes a storage unit 416. The storage unit 416 includes a machine-readable medium 422 on which the classical instructions 424 embodying any one or more of the methodologies or functions described herein can be stored. For example, the classical instructions 424 may include the functionalities of modules and systems of the quantum cloud system 230 described in FIG. 2. The classical instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 419.

In various embodiments, the memory systems can include, for example, a random access memory (RAM), a storage device (e.g., a writable read-only memory (ROM) or others), a hard disk, or another type of storage medium. The memory can include various forms of memory, media and memory devices, including by way of example, semiconductor memory devices (e.g., EPROM, EE PROM, flash memory devices, and others), magnetic disks (e.g., internal hard disks, removable disks, and others), magneto optical disks, and CD ROM and DVD-ROM disks.

The classical processing system 400 may also include a graphics display 410 (e.g., to drive a plasma display panel (PDP), a liquid crystal display (LCD), or a projector), alphanumeric input device 412 (e.g., a keyboard), a cursor control device 414 (e.g., a mouse, a trackball, a joystick, a motion sensor, or other pointing instrument), and a network interface device 419, which also are configured to communicate via the bus 408.

The classical processing system includes a signal generation device 418. The signal generation device can include radio frequency (RF) or microwave ($\mu$W) generators, radio frequency (RF) or microwave ($\mu$W) receivers, DC sources, or other type of radio frequency (RF) or microwave ($\mu$W) devices.

In these implementations, radio frequency (RF) or microwave ($\mu$W) generators and DC sources of the signal generation devices 418, can each generate control signals based on control information provided by the processors 402. The control signals can be delivered to the quantum processing system 300 by the signal generation devices 418, for example, and interact with circuit devices in the quantum processing cell 330. In some implementations, radio frequency (RF) or microwave ($\mu$W) receivers in the signaling hardware 418 can receive and process signals from the quantum processing cell 330. For example, receivers in signaling hardware 418 can include a digitizer, a microwave source, and other types of signal processing components. The receivers of the signaling hardware 418 can process (e.g., digitize, or otherwise process) the signals from the quantum processing cell 330 and provide the processed information to the processors 402. The processors 402 can extract data to identify the quantum states of qubits in the quantum processing cell 330 or for other purposes.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but is not be limited to, data repositories in the form of solid-state memories, optical media, and magnetic media.

In some instances, the classical processing system 400 operates based on a clock cycle or another type of synchronization scheme. For example, the synchronization scheme can be based on a quantum algorithm or quantum processing task. The quantum algorithm or quantum processing task may be expressed as a sequence of instructions corresponding to quantum gates, readouts, or other operations on the qubit devices, and a subset of the instructions can be executed on each clock cycle. In some instances, on each clock cycle, the classical processing system 400 generates control signals to implement a subset of instructions, control signals are delivered to the quantum computation system 300, and qubit readout signals are delivered to the classical processing system 400. The control signals delivered on each clock cycle can be configured, for example, based on the sequence of instructions, based on readout signals from a previous cycle, quantum error correction operations, error matching calculations, other information, or a combination of these.

In some embodiments, client devices may be similarly configured to the classical processing system 400. That is, the client devices can include any elements of the classical processing system, or any additional element, such that the client devices are able to send quantum algorithms or instructions to the quantum cloud system and receive the results of quantum algorithms in response.

VII. Quantum Virtual Machine

The quantum virtual machine (QVM) 420 simulates a hybrid algorithm including quantum operations on the classical processing system 400. In some configurations, the classical processing system 400 can determine that the hybrid algorithm His more efficiently executed on the QVM 420 rather than the quantum processing 300 system based on the complexity of the hybrid algorithm H. In one example, determining that the hybrid algorithm is more efficiently executed on a QVM can be based on the number of quantum operations included in the quantum algorithm, the length (in time, or in number of executions) of the hybrid algorithm, the number of qubits included in the hybrid algorithm, power and cost considerations for executing the hybrid algorithm on a quantum processor vs. a classical processor, and the like. In some configurations, the hybrid algorithm H can include an indicator representing that the hybrid algorithm H will be executed on the quantum virtual machine QVM rather than the quantum processing system 300.

Generally, a hybrid algorithm H received by the quantum cloud system 230 that can be simulated by the QVM 420 includes an encoding of a virtual quantum state. The virtual quantum state can be stored by the QVM 420 in the shared memory 240 in some embodiments. The virtual quantum state includes n qubits that form a virtual wavefunction $\psi$.

Figure 5:
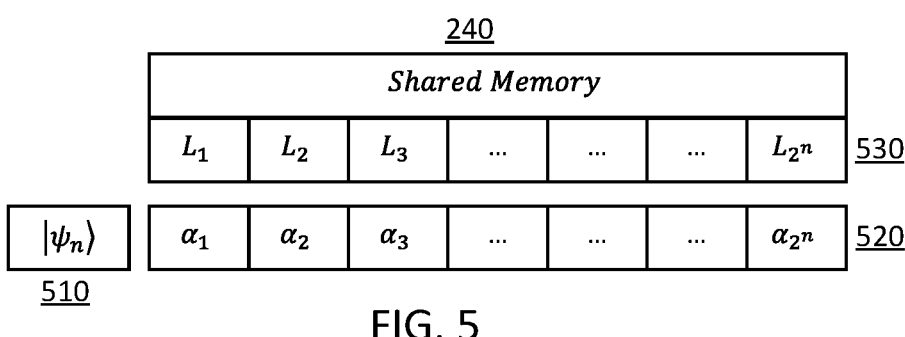
FIG. 5 is a visual representation of a classical implementation of a quantum state stored as a virtual wavefunction in the (shared) memory of the quantum cloud system, according to one example embodiment.

FIG. 5 is a visual example of a virtual quantum state stored in the shared memory as virtual wavefunction $\psi$. The virtual wavefunction $\psi$ 510 represents n qubits included in the quantum virtual state (n total qubits). The virtual wavefunction $\psi$ 510 is represented by a set of probability amplitudes $\alpha$ 520. The probability amplitudes $\alpha$ 520 are a complex probability that the n total qubits are measured in a particular combination in a measurement basis. Thus, there are $2^n$ probability amplitudes $\alpha$ 520 that represent the virtual wavefunction $\psi$ 510. Each of the probability amplitudes $\alpha$ 520 are stored in a memory location L 530 of the shared memory 240. Thus, there are $2^n$ shared memory locations L 530 for the probability amplitudes $\alpha$ 520 representing a virtual wavefunction $\psi$ 510. (FIG. 5 assumes dense representation.)

For the QVM 420, each permutation of the n total qubits can be represented by a bitwise address. A bitwise address is a representation for a distinct selection of qubits when that distance selection of qubits is measured in the computational basis. Therefore, each of the probability amplitudes $\alpha$ is associated with a bitwise address that represents each distinct selection of n total qubits that have that probability amplitude $\alpha$. In some example, the bitstring address may be represented as a bitstring vector. Further, as shown below, a subset of probability amplitudes $\alpha$ representing a subset of the n total qubits may be represented as a sub-bitstring vector.

As an example, the bitwise addresses for a virtual wavefunction including three qubits can be represented by Table 1. In Table 1, the first column represents all possible combinations of qubits in the virtual wavefunction $\psi$ when measured in the computational basis. The second through fourth column, in combination, represent the bitwise addresses for all combinations of qubits in the virtual wavefunction $\psi$. The second through fourth column, individually, represent a classical measurement for each of the three qubits $Q_1$, $Q_2$, and $Q_3$ in the virtual wavefunction $\psi$. The fifth column represents the probability amplitude $\alpha$ for each possible combination of qubits in the virtual wavefunction $\psi$.

TABLE 1

| | $Q_1$ | $Q_2$ | $Q_3$ | Prob. Amp. |
|---|---|---|---|---|
| $\psi_{000}$ | 0 | 0 | 0 | $\alpha_{000}$ |
| $\psi_{001}$ | 0 | 0 | 1 | $\alpha_{001}$ |
| $\psi_{010}$ | 0 | 1 | 0 | $\alpha_{010}$ |
| $\psi_{011}$ | 0 | 1 | 1 | $\alpha_{011}$ |
| $\psi_{100}$ | 1 | 0 | 0 | $\alpha_{100}$ |
| $\psi_{101}$ | 1 | 0 | 1 | $\alpha_{101}$ |
| $\psi_{110}$ | 1 | 1 | 0 | $\alpha_{110}$ |
| $\psi_{111}$ | 1 | 1 | 1 | $\alpha_{111}$ |

As a more general example, a virtual wavefunction $\psi$ that includes n total qubits is represented by $2^n$ probability amplitudes $\alpha$ stored at $2^n$ memory locations L. Each $2^n$ probability amplitudes $\alpha$ is associated with a bitwise address. The bitwise addresses for the n total qubits of the virtual wavefunction $\psi$ are, effectively, a bitwise counter from 0 to $2^{n-1}$. For example, for a virtual wavefunction including 7 qubits, the bitwise addresses are 0000000, 0000001, 0000010, 0000011, . . . , 1111111. Each of the $2^7$ probability amplitudes $\alpha$ associated with a bitwise address is stored at one of $2^7$ memory locations in the shared memory.

The QVM 420 can manipulate the virtual wavefunction using quantum operations U included in a hybrid algorithm H. The quantum operations U can act on any k number of qubits included in the virtual wavefunction (k acted-on qubits) and change the probability amplitudes $\alpha$ associated with each bitwise address of the virtual wavefunction $\psi$. The QVM executes a quantum operation U by accessing subsets of the probability amplitudes $\alpha$ and performing the quantum operation U on the accessed subsets of probability amplitudes a. Generally, the order of the k acted-on qubits of a quantum operations U is significant. Accordingly, the QVM 420 accesses the probability amplitudes $\alpha$ in each subset in a particular order and performs the quantum operation U on a particular order of probability amplitudes a. The QVM 420 can perform any number of quantum operations U on a virtual wavefunction $\varphi$ and after every quantum operation some, or all, of the probability amplitudes $\alpha$ may change. Alternatively stated, the QVM 420 can evolve a quantum virtual state (pure state evolution) using quantum operations U acting on a virtual wavefunction $\psi$. Executing a hybrid algorithm H to evolve a quantum virtual state using the QVM 420 is described in more detail in Section VIII. A quantum operation may be represented in the shared memory as a matrix, a sparse matrix, a permutation representation, a diagonal representation of a matrix, or any other way to represent a quantum operation.

Figure 6:
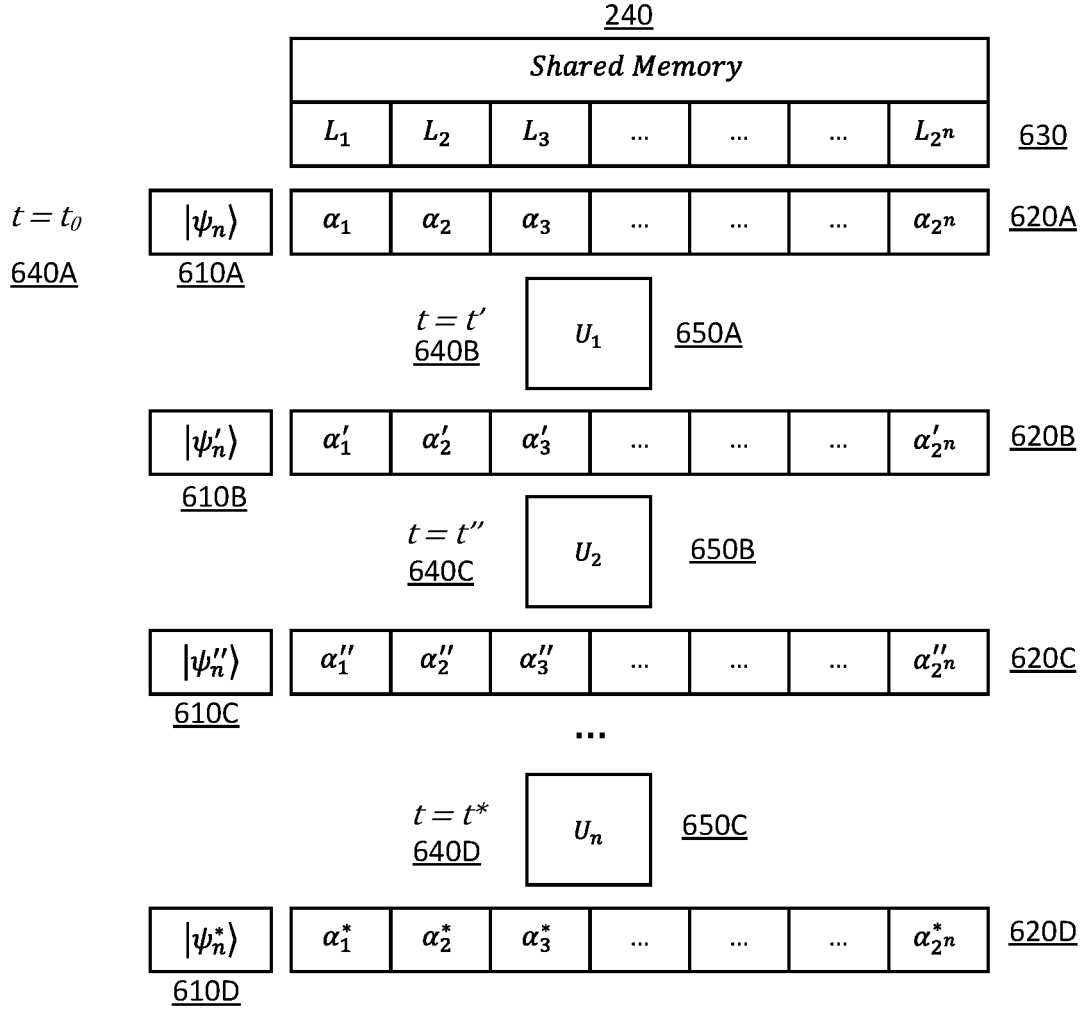
FIG. 6 is a visual representation of the evolution of a virtual wavefunction using quantum operations, according to one example embodiment.

FIG. 6 is a visual example of a state evolution of a quantum virtual state including a virtual wavefunction $\psi$ by executing a quantum operation U on complex amplitudes $\alpha$ of the virtual wavefunction $\psi$ stored in shared memory. FIG. 6 includes a virtual wavefunction 610 of n total qubits represented by $2^n$ probability amplitudes $\alpha_i$ stored in $2^n$ memory locations 630 of the shared memory 240. The QVM 420 initializes the virtual wavefunction $\psi_n$ 610A with probability amplitudes $\alpha_i$ 620A at time $t=t_0$ 640A. The QVM 420 executes a first quantum operation $U_1$ 650A on the virtual wavefunction $\psi_n$ 610A at time $t=t'$ 640B which evolves the virtual wavefunction $\psi_n$ 610A to virtual wavefunction $\psi'_n$ 610B. Virtual wavefunction $\psi'_n$ 610B is represented by complex amplitudes $\alpha'_i$ 620B stored in memory locations 630. The QVM 420 executes a second quantum operation $U_2$ 650B on the virtual wavefunction $\psi'_n$ 610B at time $t=t''$ 640C which evolves the virtual wavefunction $\psi'_n$ 610B to virtual wavefunction $\psi'_n$ 610C. Virtual wavefunction $\psi'_n$ 610C is represented by complex amplitudes $\alpha''_i$ 620C stored in memory locations 630. Eventually, the QVM 420 executes a final quantum operation $U_n$ 650C on a virtual wavefunction at time $t=t^*$ 640D which evolves the virtual wavefunction to a final virtual wavefunction $\psi^*_n$ 610D. Virtual wavefunction $\psi^*_n$ 610D is represented by complex amplitudes $\alpha^*_i$ 620D stored in memory locations 630.

VIII. Evolving a Quantum Virtual State

As previously described, executing a hybrid algorithm H on the QVM 420 evolves a quantum virtual state. Quantum operations U of the hybrid algorithm H can act on any subset of the qubits (k acted on qubits) included in the n qubits (n total qubits) of the virtual wavefunction $\psi$. FIG. 7 illustrates a method for executing quantum operations U on a virtual wavefunction $\psi$ based on the n total qubits and the k acted-on qubits. The method 700 of this embodiment can include additional or fewer steps, or the steps can be executed in another order.

With reference to FIGS. 2, 5, 6 & 7, the quantum cloud system 230 receives 710 a hybrid algorithm H from an access node 210 via the network 220. The hybrid algorithm H includes a quantum virtual state including virtual wavefunction $\psi$ of n total qubits. The QVM 420 initializes the virtual wavefunction $\psi$ in the shared memory 240 as a vector of $2^n$ probability amplitudes $\alpha$ (i.e., a bitstring vector). The virtual wavefunction $\psi$ can include entangled qubits and/or untangled qubits. Each probability amplitude $\alpha$ is stored in a memory location L and is associated with a bitwise address. The bitwise address for each probability amplitude $\alpha$ represents a particular combination of qubits in the virtual wavefunction $\psi$ measured in the computational basis (as shown in Table 1). The hybrid algorithm H includes a quantum operation U that evolves the virtual wavefunction $\psi$ by applying the quantum operation U on subsets of the probability amplitudes $\alpha$ of the virtual wavefunction $\psi$. In this example, the quantum operation U includes k acted-on qubits of the n total qubits. The quantum operation U is sometimes represented as a $2^k \times 2^k$ matrix and is stored in the shared memory 240.

The QVM determines 720 an ordered sequence of virtual partial wavefunctions based on the n total qubits and the k acted-on qubits. In one configuration, the QVM determines that there are $2^{n-k}$ virtual partial wavefunctions in a sequence and each virtual partial wavefunction is a vector of length $2^k$. A virtual partial wavefunction $\varphi$ is some subset of the probability amplitudes $\alpha$ representing the virtual wavefunction $\psi$ (i.e., a sub-bitstring vector) that can be represented as a vector of length $2^k$. Therefore, each element of the virtual partial wavefunction is a probability amplitude $\alpha$ of the virtual wavefunction $\psi$.

The QVM 420 determines 720 the elements and the element order for each virtual partial wavefunction $\varphi$ of the set of virtual partial wavefunctions based on n total qubits and the k acted-on qubits. To begin, the QVM 420 "mutes" bits of the bitwise addresses of the virtual wavefunction $\psi$ associated with the k acted-on qubits. Muting a bit of the bitstring address results in the QVM 420 ignoring those bits when selecting probability amplitudes $\alpha$ for the elements of a virtual partial wavefunction and ordering the selected elements based on the muted bits. Each $2^n$ bitstring address is associated with a probability amplitude $\alpha$ and has k muted bits and n–k unmuted bits. For example, if a quantum operation U acts on the $i^{th}$ qubits of the n total qubits, the $i^{th}$ bit of the bitstring address is muted. Using the example of Table 1, if the quantum operation U acts on the second qubit $Q_2$ the second bit of the bitstring address is muted. The muted bitstring addresses, in this example, are "0 x0" "0x1," "0 x0," "0x1," . . . and "1x1," where each "x" represents a muted bit.

Next, the QVM generates a span counter to select elements for the virtual partial wavefunctions. A span counter is a representation of all n–k unmuted bits in the bitwise addresses of a qubit-string. In other words, a span counter is a bitwise representation of all distinct choices of bits in a virtual wavefunction $\psi$ that the quantum operation U does not act on. Thus, the span counter is a bitwise counter of n–k bits with $2^{n-k}$ combinations of bits and each bit in the span counter is associated with one of the n–k qubits in the virtual wavefunction $\psi$ that the quantum operation U does not act on. For example, consider a virtual wavefunction including an $i^{th}$, $j^{th}$, and $k^{th}$ qubit. The $i^{th}$, $j^{th}$, and $k^{th}$ qubit are each associated with the $i^{th}$, $j^{th}$, and $k^{th}$ bit in the bitwise addresses of the virtual wavefunction $\psi$. In this example, the quantum operation U operates on the $i^{th}$ qubit of the virtual wavefunction $\psi$. Therefore, the span counter is a bitwise representation of all selections of the $j^{th}$ and $k^{th}$ bits of the virtual wavefunction.

For context, consider the bitstring addresses of Table 1. If the quantum operation U acts on the second qubit $Q_2$, the second bit in the bitwise addresses is muted. The span counter is generated from the unmuted bits in the bitwise addresses (the column of qubits $Q_1$ and $Q_3$). The span counter is all possible combinations of the unmuted bits in the bitwise addresses, which are, in this case, are "00," "01," "10," and "11." In an alternate example, if the quantum operation U acts on the first qubit $Q_1$ and the third qubit $Q_3$, the span counter includes all possible combinations of bits in the bitwise addresses absent the bits associated with first qubit $Q_1$ and third qubit $Q_3$, which, in this case, are "0" and "1".

The QVM 420 determines the elements for each of the set of virtual partial wavefunctions using the span counter and the muted bitstring addresses. The span counter includes n–k bits having $2^{n-k}$ bitwise combinations of the n–k bits. The bitwise addresses include $2^n$ bitwise combinations of the n qubits in the virtual wavefunction $\psi$. However, when considering the k muted bits in the muted bitwise addresses for the virtual wavefunction $\psi$, there are $2^{n-k}$ combinations of bits with each combination having $2^k$ repeated combinations of bits. Therefore, the QVM 420 determines that the $2^k$ elements for each of the set of $2^{n-k}$ virtual partial wavefunctions are the $2^k$ probability amplitudes $\alpha$ associated with the $2^k$ muted bitstring addresses that have the same n–k unmuted bits as the n–k bits in the span counter.

For context, using the example of Table 1, if the quantum operation U acts on the second qubit $Q_2$ and the third qubit $Q_3$, there are four bitstring addresses ("000," "001," "010" and "011") that have the same muted bitstring address ("0xx") as the first entry in the span counter "0". Thus, the QVM 420 determines that the elements for one of the set of quantum sub bitstrings $\varphi$ are the probability amplitudes $\alpha_{000}$, $\alpha_{001}$, $\alpha_{010}$, and $\alpha_{011}$ associated with those four bitstring addresses. The other virtual partial wavefunctions in the set are similarly determined based on the span counter and muted bitstring addresses.

The QVM 420 can determine the order for the elements for each of the virtual partial wavefunctions based on the muted bitstring addresses and the k acted-on qubits. The order that quantum operation U acts on the k acted-on qubits determines the order of the $2^k$ elements in each of the $2^{n-k}$ virtual partial wavefunctions. The order of the determined elements for each virtual partial wavefunction $\varphi$ follows the bitwise counting of muted bits in the bitstring address for the determined elements according to the order of the k acted-on qubits.

For example, consider the virtual wavefunction $\varphi$ including an $i^{th}$, $j^{th}$, and $k^{th}$ qubit and a quantum operation U that acts on the $j^{th}$ and $k^{th}$ qubits of the virtual wavefunction $\psi$. In this example, the $j^{th}$ and $k^{th}$ bits of the virtual wavefunction $\psi$ are muted. The determined elements for the virtual partial wavefunction $\varphi$ are the 4 probability amplitudes $\alpha$ associated with a bitstring address whose unmuted $i^{th}$ bits are the same as the bit of the span counter. The order of the determined probability amplitudes for the virtual partial wavefunction $\varphi$ follows the bitwise counting of the $j^{th}$ and $k^{th}$ muted bits. In the alternate example where the quantum operation U acts on the $k^{th}$ and $j^{th}$ qubit of the virtual wavefunction, the order of the determined probability amplitudes $\alpha$ follows the bitwise counting of the $k^{th}$ and $j^{th}$ muted bits.

Continuing the contextual example above, referring again to Table 1, the determined elements of a virtual partial wavefunction $\varphi$ are the probability amplitudes $\alpha_{000}$, $\alpha_{001}$, $\alpha_{010}$, and $\alpha_{011}$ that have the same muted bitstring address ("0xx") as the first entry in the span counter "0". In the example where the quantum operation U acts on the second qubit $Q_2$ and the third qubit $Q_3$, the muted bits in the muted bitstring addresses follow "00" "01" "10" and "11" where the first bit is associated with the second qubit $Q_2$ and the second bit is associated with the third qubit $Q_3$. The order of the probability amplitudes follows the order of the bitwise counting of the muted bits. Accordingly, in this example, the QVM determines the probability amplitudes are ordered as $\alpha_{000}$, $\alpha_{001}$, $\alpha_{010}$, and $\alpha_{011}$. In the example where the quantum operation U acts on the third qubit and the second qubit, the muted bits in the muted bitstring addresses follow "00" "01" "10" and "11" where the first bit is associated with the third qubit and the second bit is associated with the second qubit. In this example, the QVM determines the probability amplitudes are ordered as $\alpha_{000}$, $\alpha_{010}$, $\alpha_{001}$, and $\alpha_{011}$.

The QVM accesses 730 the probability amplitudes $\alpha$ determined 720 for each virtual partial wavefunction $\varphi$ of the set of virtual partial wavefunctions from their corresponding memory locations. Because each of the virtual partial wavefunctions $\varphi$ accesses probability amplitudes $\alpha$ from different memory locations, the QVM can utilize a different processor for each virtual partial wavefunction.

The QVM executes 740 the quantum operation U on the set of virtual partial wavefunctions. In some instances, executing the quantum operation U on the set of virtual partial wavefunctions includes a matrix multiplication of the quantum operation U and each virtual partial wavefunction $\varphi$ of the set of virtual partial wavefunctions. The quantum operation U acting on k qubits can be represented by a $2^k \times 2^k$ matrix and each virtual partial wavefunction $\varphi$ is represented by a $2^k$ vector. In other examples, the quantum operation can be a permutation representation. Executing the quantum operation U on a virtual partial wavefunction $\varphi$ yields a resulting virtual partial wavefunction $\varphi^*$. The resulting virtual partial wavefunction $\varphi^*$ is a $2^k$ vector including $2^k$ resulting probability amplitudes $\alpha^*$.

The QVM 420 stores 750 the resulting probability amplitudes $\alpha^*$ in the memory locations L of the corresponding accessed probability amplitudes $\alpha$. More explicitly, each accessed probability amplitude is assigned a vector location in a $2^k$ virtual partial wavefunction and each resulting probability amplitude has a vector location in the $2^k$ resulting virtual partial wavefunction $\varphi$. The resulting probability amplitudes $\alpha^*$ at a given vector location of the resulting virtual partial wavefunction $\varphi^*$ are stored in the same memory location L of the accessed probability amplitude $\alpha$ having the same vector location in the virtual partial wavefunction $\varphi$. For example, if the accessed probability amplitude $\alpha$ from the memory location $L_i$ is assigned the $j^{th}$ vector location of the virtual partial wavefunction $\varphi$, the resulting probability amplitude $a^*$ in the $j^{th}$ vector location of the resulting virtual partial wavefunction $\varphi^*$ is stored in memory location $L_i$.

The QVM 420 determines 760 the result of the hybrid algorithm based on the stored resulting probability amplitudes $\alpha^*$. Generally, the QVM 420 determines 750 the result by executing a measurement operation on the evolved virtual wavefunction. The measurement operation is generally one or more matrix multiplications that calculates a probability of observing a specific combination of qubits from the resulting probability amplitudes. That is, a measurement calculates $|\alpha|^2$, $|\beta|^2$, etc.

IX. Example Execution of a Hybrid Algorithm Using the Quantum Virtual Machine

FIGS. 8A-8F are diagrams representing an example execution of a hybrid algorithm H using the QVM using method 700, according to one example embodiment. Execution of the hybrid algorithm H includes evolving a quantum virtual state using the quantum virtual machine. In this example, the quantum virtual machine receives a hybrid algorithm H including a single quantum operation U. The quantum virtual state in the hybrid algorithm H includes a virtual wavefunction $\psi$ including 4 qubits (n=4) and the quantum operation U acts on the $1^{st}$ and the $3^{rd}$ qubit (k=2) of the virtual wavefunction $\psi$. The QVM 420 initializes the virtual wavefunction as 16 probability amplitudes $\alpha$ ($2^n = 2^4 = 16$) stored in 16 memory locations L.

The left-hand table of FIG. 8A is a visual representation 800 of the virtual wavefunction $\psi$. The first column 802 represents all possible combinations of the 4 qubits of the virtual wavefunction $\psi$ in the measurement basis. The second through fifth columns represent the bitwise address 804 for each of the possible combinations of the 4 qubits in the virtual wavefunction $\psi$. Each bit of the bitwise address 804 is associated with a qubit of the virtual wavefunction $\psi$. That is, the first bit of the bitwise address 804 is associated with the first qubit of the virtual wavefunction $\psi$, the second bit of the bitwise address 804 is associated with the second qubit of the virtual wavefunction $\psi$, etc. Thus, each combination of the 4 qubits has 4 bits that make up its bitwise address 804. Each combination of qubits, or bitwise address 804, has a probability amplitude $\alpha$ 806 stored at memory location $L_n$ 808. Thus, the virtual wavefunction $\psi$ can be stored as a vector including 16 probability amplitudes $\alpha$.

Next, the QVM 420 determines a number of virtual partial wavefunctions $\varphi$ 810 and their elements. The virtual partial wavefunctions $\varphi$ 810 are illustrated as the set of empty vectors on the right side of FIG. 8A. The number of virtual partial wavefunctions $\varphi$ 810 is based on the n total qubits and the k acted-on qubits. In this example, the number of virtual partial wavefunctions $\varphi$ 810 is 4 ($2^{n-k}=2^{4-2}=4$). Each of the virtual partial wavefunctions $\varphi$ 810 is a vector with a size based on the acted-on qubits. In this example, the size of each virtual partial wavefunction $\varphi$ 810 is 4 ($2^k=2^2=4$).

The QVM 420 mutes the bits of the bitwise addresses 804 based on the k acted-on qubits. In this example, the QVM 720 mutes the first bit and the third bit of the bitwise address 804 because the quantum operation U acts on the first and third qubit of the virtual wavefunction $\psi$ 800. FIG. 8B shows a representation of the virtual wavefunction 800 with the bits of the bitwise addresses 804 associated with the first and third qubit muted (muted bitwise addresses 820). Here, a muted bit 822 includes a "x" overlaid on the "0" or "1" of the bitwise address.

The QVM 420 generates a span counter 830 based on the n total qubits and the k acted-on qubits. The span counter 830 includes every bitwise combination of the unmuted bits in the muted bitwise addresses 820. In this example, the span counter 830 includes 2 bits (n−k=4−2=2) and includes 4 combinations of bits ($2^{n-k}=2^{4-2}=4$). In FIG. 8B, the span counter 830 is illustrated as a table including the possible combinations of unmuted bits (the second bit and fourth bit of the muted bitwise addresses 820).

The QVM 420 determines 720 the virtual partial wavefunction $\varphi$ 810 elements based on the muted bitstring addresses 820 and the span counter 830, accesses 730 probability amplitudes $\alpha$ 806, executes 740 the quantum operation U, and stores 750 the resulting probability amplitudes. In this example, the 4 elements for a virtual partial wavefunction $\varphi$ 810 are, for each combination of 2 bits in the span counter 830, the probability amplitudes $\alpha$ 806 that have a muted bitwise address 820 that are the same for that combination of bits in the span counter 830. The QVM 420 accesses 730 the probability amplitudes 806 for each virtual partial wavefunction $\varphi$ 810 and executes 740 the quantum operation U on the virtual partial wavefunction $\varphi$ 810. In this example, executing 740 the quantum operation U includes multiplying (or some other computation) a 4×4 matrix representing the quantum operation U ($2^k \times 2^k=2^2 \times 2^2=4\lambda4$) by each length 4 vector representing the virtual partial wavefunction $\varphi$ 810. The result of the quantum operation is 4 resulting virtual partial wavefunctions $\varphi'$ 812 including a set of 4 resulting probability amplitudes. The QVM 420 stores 750 the resulting probability amplitudes in the memory locations 808 of the corresponding bitwise addresses 804 for the accessed probability amplitudes 806.

Figure 8C:
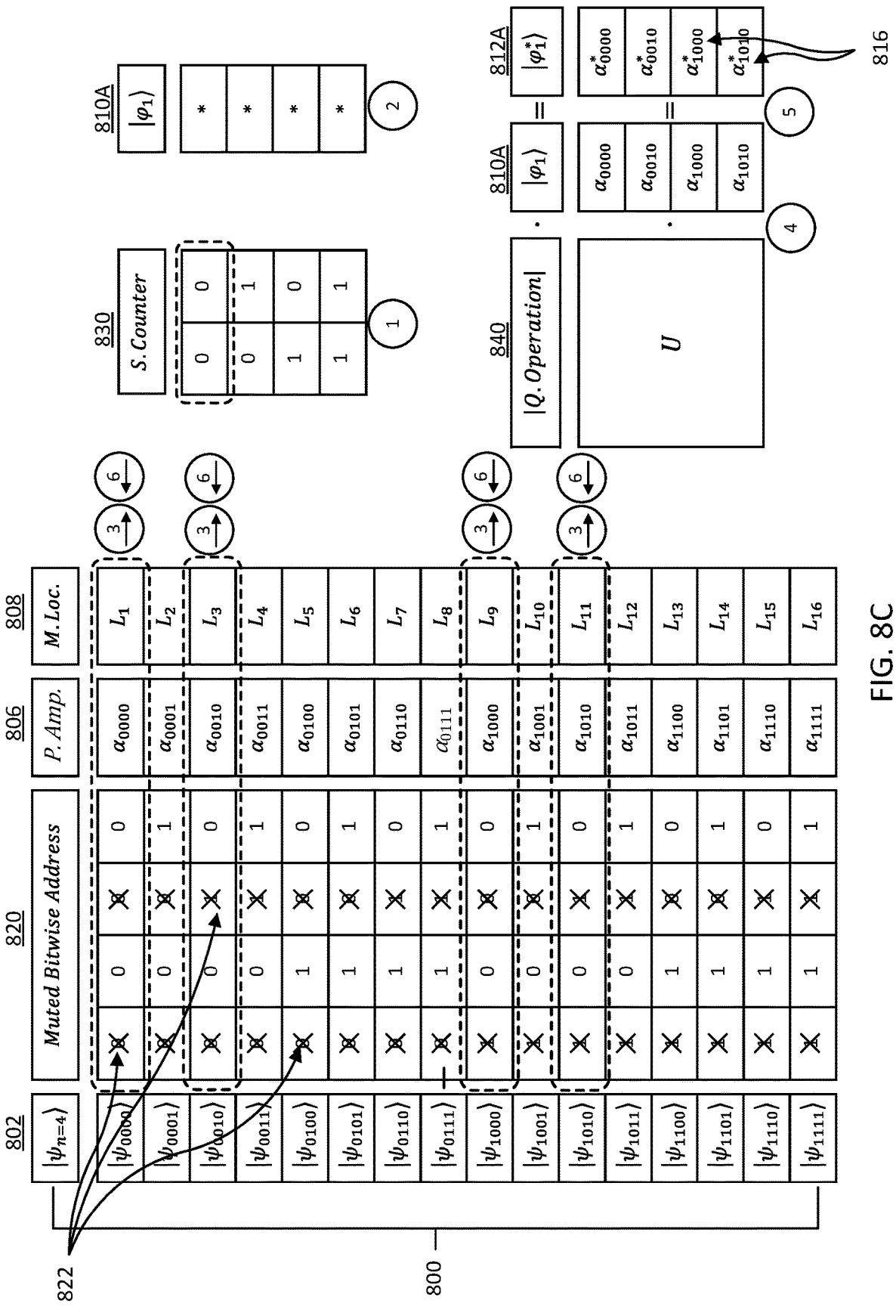
Figure 8D:
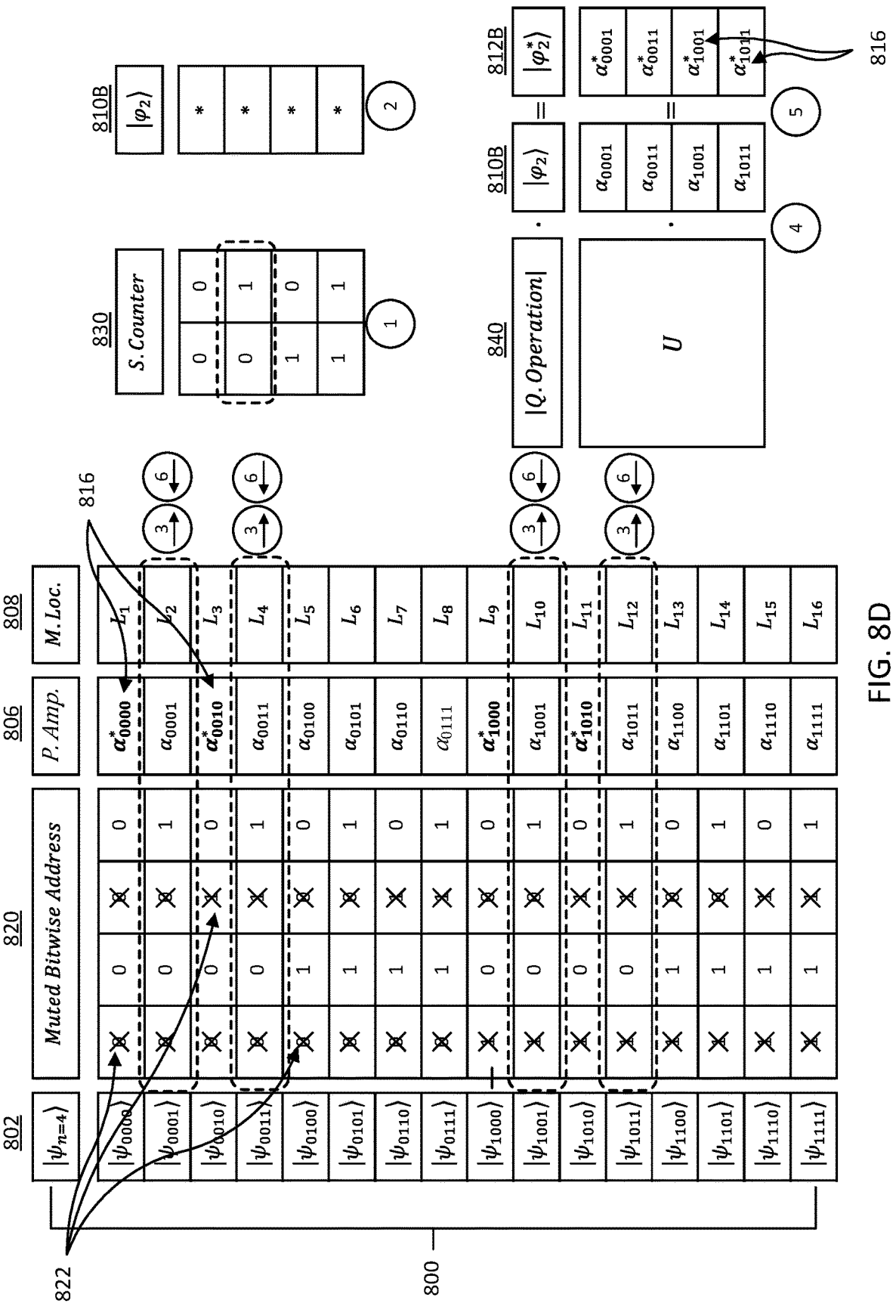
Figure 8E:
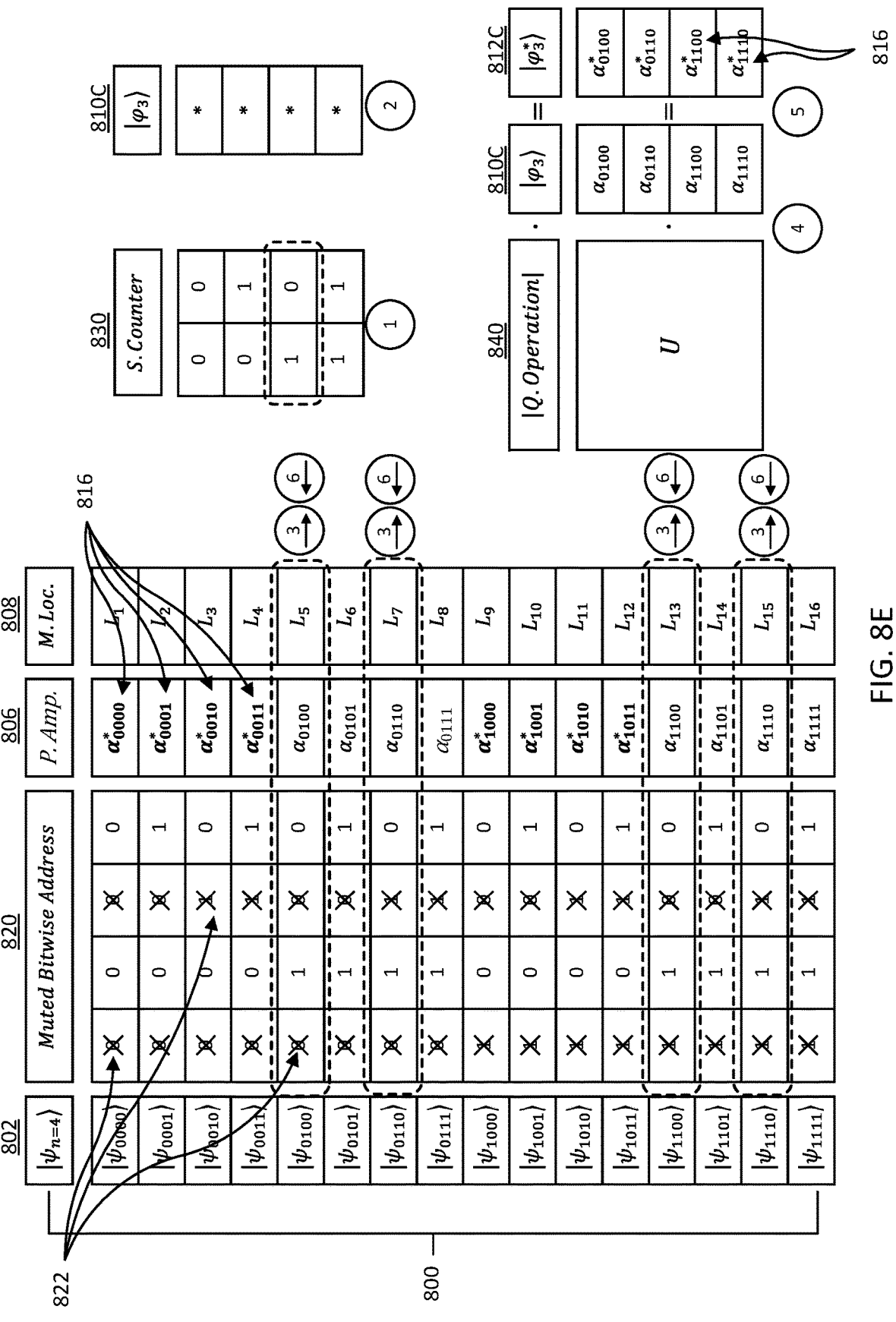

FIG. 8C-8E shows the processes of determining 720 virtual partial wavefunction elements, accessing 730 the probability amplitudes, executing 740 the quantum operation, and storing 750 the resulting probability amplitudes for each virtual partial wavefunction $\varphi$ 810. In this example, the 4 elements for a virtual partial wavefunction $\varphi$ 810 are, for each combination of 2 bits in the span counter 830, the probability amplitudes $\alpha$ 806 that have a muted bitwise address 820 that are the same for that combination of bits in the span counter 830. The order of the accessed probability amplitudes $\alpha$ 806 is based on the k acted-on qubits. The QVM 420 accesses 730 the probability amplitudes 806 for each virtual partial wavefunction $\varphi$ 810 and executes 740 the quantum operation U on the virtual partial wavefunction $\varphi$ 810. Executing 740 the quantum operation U includes multiplying a 4×4 matrix representing the quantum operation U ($2^k \times 2^k=2^2 \times 2^2=4\lambda4$) by each length 4 vector representing the virtual partial wavefunction $\varphi$ 810. The result of the quantum operation is 4 resulting virtual partial wavefunctions $\psi'$ 812 including sets of 4 resulting probability amplitudes 816. The QVM 420 stores 750 the resulting probability amplitudes in the memory locations 808 corresponding to the bitwise addresses 804 for the accessed probability amplitudes 806. While the processes are shown sequentially for each virtual partial wavefunction $\varphi$ 810, the processes can be executed in parallel for each virtual partial wavefunction $\varphi$ 810 using multiple processing cores of the QVM 420. That is the classical processing system can schedule the instructions in any manner described herein.

FIG. 8C shows the determining 720, accessing 730, executing 740, and storing 750 processes for the first virtual partial wavefunction $\varphi_1$ 810A. The span counter 830 indicates "00" (indicated with a circled 1) as the bits for determining 720 elements of the first virtual partial wavefunction $\varphi_1$ 810A. Therefore, the QVM 420 determines 720 that the elements for the first virtual partial wavefunction $\varphi_1$ 810A (indicated with a circled 2) are probability amplitudes 806 $\alpha_{0000}$, $\alpha_{0010}$, $\alpha_{1000}$, and $\alpha_{1010}$ because their muted bitwise addresses 820 are "x0x0" which are similar to the span counter 830 "00" when ignoring the muted bits 822. The order of the elements for the first virtual partial wavefunction $\varphi_1$ 810A follows the bitwise counting of the muted bits 822 for the first qubit and third qubit. That is, in this example, the element order follows the "00," "01," "10," and "11" bits of the first and third columns of the muted bitwise addresses 820 whose unmuted bits are the same as the span counter 830.

The QVM 720 accesses 730 (indicated with a circled 3) the probability amplitudes 806 from the memory locations 808 $L_1$, $L_3$, $L_9$ and $L_{11}$, respectively. The QVM 420 executes (indicated with a circled 4) the quantum operation U 840 on the first virtual partial wavefunction $\varphi_1$ 810A using a matrix multiplication that generates (indicated by circled 5) a resulting virtual partial wavefunction $\varphi^*_1$ 812A which includes the resulting probability amplitudes 816 $\alpha^*_{0000}$, $\alpha^*_{0010}$, $\alpha^*_{1000}$, and $\alpha^*_{1010}$. The QVM 420 stores 750 (indicated by circled 6) the resulting probability amplitudes 816 for a given vector location in the resulting virtual partial wavefunction $\varphi^*_1$ 812A at the same memory 808 location as the accessed probability amplitude 806 in the same vector location of the virtual partial wavefunction 810A. That is, in this example, $\alpha^*_{0000}$ is stored in memory location $L_1$, $\alpha^*_{0010}$ is stored in memory location $L_3$, $\alpha^*_{1000}$ is stored in memory location $L_9$, and $\alpha^*_{1010}$ is stored in memory location $L_{11}$.

In an alternate example where the quantum operation U 840 acts on the third qubit and first qubit, the accessed 730 probability amplitudes 806 are ordered as $\alpha_{0000}$, $\alpha_{1000}$, $\alpha_{0010}$, and $\alpha_{1010}$. The order of the elements follows the bitwise counting of the muted bits for the third qubit and first qubit (rather than first and third, as above). Accordingly, in this example, the element order follows the "00," "01," "10," and "11" bits of the third and first columns of the muted bitwise addresses 820 whose unmuted bits are the same as the span counter 830. The QVM 420 stores 750 the resulting complex amplitudes similarly to above. This reordering example can be similarly applied to the virtual partial wavefunctions 810 in FIGS. 8D-8F but is not expressly described.

FIG. 8D shows the determining 720, accessing 730, executing 740, and storing 750 processes for the second virtual partial wavefunction $\varphi_2$ 810B. In this figure, the resulting probability amplitudes 816 from the previous step are illustrated (and bolded) in their appropriate memory locations 808. The span counter 830 for the second virtual partial wavefunction 810B is at "01" (indicated with a circled 1). Therefore, the QVM 420 determines 720 that the elements for the second virtual partial wavefunction $\varphi_2$ 810B (indicated with a circled 2) are probability amplitudes 806 $\alpha_{0001}$, $\alpha_{0011}$, $\alpha_{1001}$, and $\alpha_{1011}$. The order of the elements follows the bitwise counting of the muted bits 822 for the first qubit then the third qubit. The QVM 420 accesses 730 (indicated with a circled 3) the probability amplitudes 806 from the memory locations 808 $L_2$, $L_4$, $L_{10}$ and $L_{12}$, respectively. The QVM 420 executes 740 the quantum operation (indicated with a circled 4) on the second virtual partial wavefunction $\varphi_2$ 810B and generates (indicated with a circled 5) a resulting virtual partial wavefunction $\varphi^*_2$ 812B which includes the resulting probability amplitudes 816 $\alpha^*_{0001}$, $\alpha^*_{0011}$, $\alpha^*_{1001}$, and $\alpha^*_{1011}$. The QVM 420 stores 750 (indicated with a circled 6) the resulting probability amplitudes 816 at the appropriate memory locations 808.

FIG. 8E shows the determining 720, accessing 730, executing 740, and storing 750 processes for the third virtual partial wavefunction $\varphi_3$ 810C. In this figure, the resulting probability amplitudes 816 from the previous steps are illustrated (and bolded) in their appropriate memory locations 808. The span counter 830 for the third virtual partial wavefunction $\varphi_3$ 810C is at "10" (indicated with a circled 1). Therefore, the QVM 420 determines 720 that the elements for the third virtual partial wavefunction $\varphi_3$ 810C (indicated with a circled 2) are probability amplitudes 806 $\alpha_{0100}$, $\alpha_{0110}$, $\alpha_{1100}$, and $\alpha_{1110}$. The order of the elements follows the bitwise counting of the muted bits 822 for the first qubit then the third qubit. The QVM 420 accesses 730 (indicated with a circled 3) the probability amplitudes 806 from the memory locations 808 $L_5$, $L_7$, $L_{13}$ and $L_{15}$, respectively. The QVM 420 executes 740 the quantum operation (indicated with a circled 4) on the third virtual partial wavefunction $\varphi_3$ 810C and generates (indicated with a circled 5) a resulting virtual partial wavefunction $\varphi^*_3$ 812C which includes the resulting probability amplitudes 816 $\alpha^*_{0100}$, $\alpha^*_{0110}$, $\alpha^*_{1100}$, and $\alpha^*_{1110}$. The QVM 420 stores 750 (indicated with a circled 6) the resulting probability amplitudes 816 at the appropriate memory locations 808.

Figure 8F:
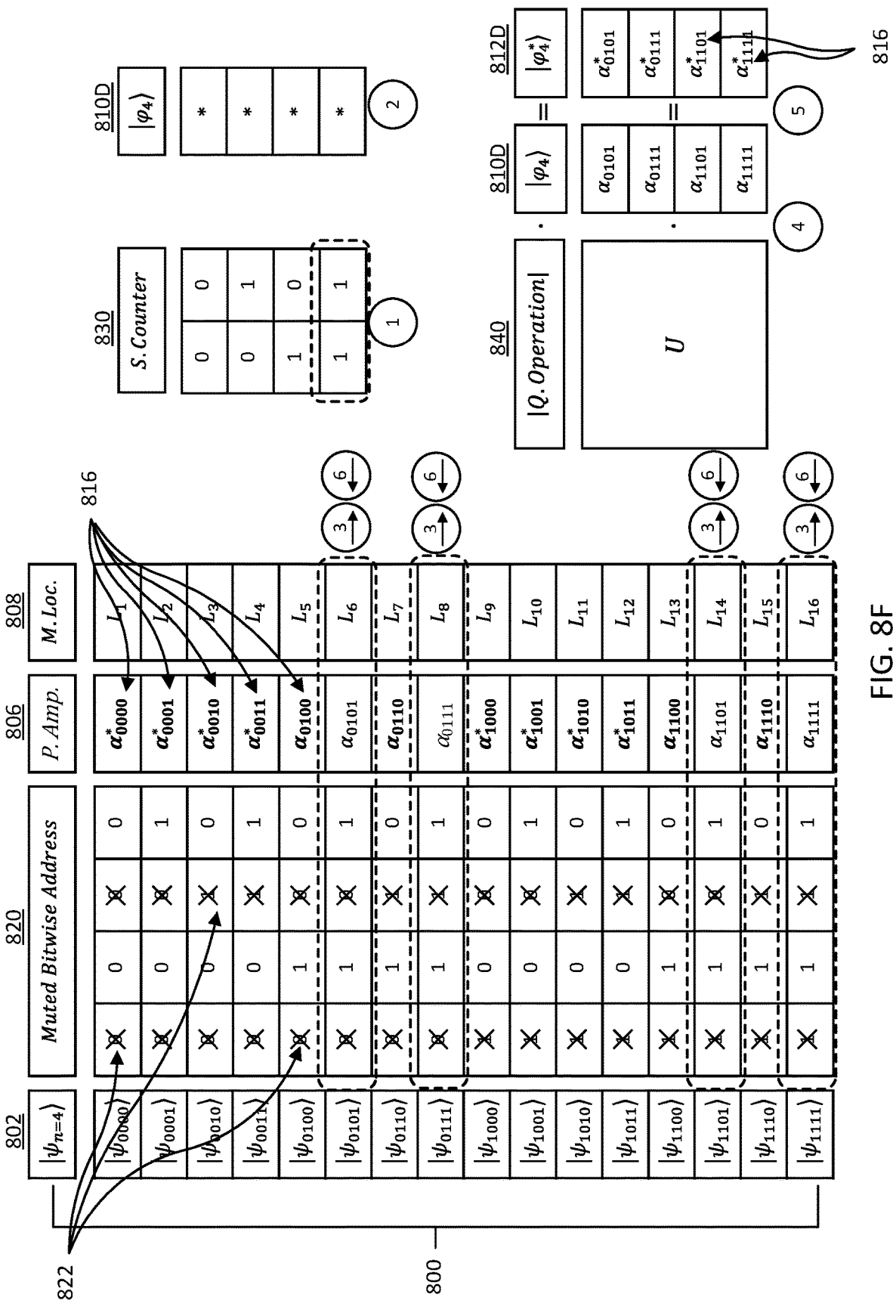

Finally, FIG. 8F shows the determining 720, accessing 730, executing 740, and storing 750 processes for the fourth virtual partial wavefunction $\varphi_4$ 810D. In this figure, the resulting probability amplitudes 816 from the previous steps are illustrated (and bolded) in their appropriate memory locations 808. The span counter 830 for the fourth virtual partial wavefunction $\varphi_4$ 810D is at "11" (indicated with a circled 1). Therefore, the QVM 420 determines 720 that the elements for the fourth virtual partial wavefunction $\varphi_4$ 810D (indicated with a circled 2) are probability amplitudes 806 $\alpha_{0101}$, $\alpha_{0111}$, $\alpha_{1101}$ and $\alpha_{1111}$. The order of the elements follows the bitwise counting of the muted bits 822 for the first qubit then third qubit. The QVM 420 accesses 730 (indicated with a circled 3) the probability amplitudes 806 from the memory locations 808 $L_6$, $L_8$, $L_{14}$ and $L_{16}$, respectively. The QVM 420 executes 740 the quantum operation (indicated with a circled 4) on the fourth virtual partial wavefunction $\varphi_4$ 810D and generates (indicated with a circled 5) a resulting virtual partial wavefunction $\varphi^*_4$ 812D which includes the resulting probability amplitudes 816 $\alpha^*_{0101}$, $\alpha^*_{0111}$ $\alpha^*_{1101}$ and $\alpha^*_{1111}$. The QVM 420 stores 750 (indicated with a circled 6) the resulting probability amplitudes 816 at the appropriate memory locations 808.

The QVM determines 460 the result of the hybrid algorithm H by measuring the resulting probability amplitudes 816 of the evolved virtual wavefunction 800. Measurement of the resulting probability amplitudes 816 includes a matrix operation that results in a probability of measuring the n qubits of the virtual wavefunction $\psi$ in a particular combination ("$\psi_{0000}$" at probability $p_{0000}$, "$\psi_{0001}$" at probability $p_{0001}$, . . . , and "$\psi_{1111}$" at probability $p_{1111}$).

The preceding example demonstrates a particular n total number of qubits and a particular k acted-on qubits. However, contrary to previously disclosed classical representations of a quantum processing system, the QVM 420 is configured to dynamically determine virtual partial wavefunctions $\varphi$ and evolve a virtual wavefunction $\psi$ for n total qubits and k acted-on qubits.

X. Additional Considerations

Traditionally, systems that simulate quantum operations on classical hardware (traditional simulators) use different methods than the quantum virtual machine described herein. Generally, traditional simulators "tensor up" a quantum operation rather than determining virtual partial wavefunctions. As described above, a quantum operation U can be represented by a $2^k \times 2^k$ matrix in the shared memory 240. Tensoring up the quantum operation U includes generating a $2^n \times 2^n$ matrix that includes the $2^k \times 2^k$ quantum operation. This allows traditional simulators to use traditional routines of linear algebra libraries to simulate quantum operations because the state evolution becomes a $2^n \times 2^n$ on a $2^n$ element state vector. However, this process can be incredibly wasteful, especially when the k acted-on qubits and the n total qubits are highly different.

The QVM 420 mitigates this issue by "picking apart" virtual wavefunctions to simulate quantum operations. For example, the QVM 420 allocates 4 memory locations for a quantum operation acting on a single qubit of ten total qubits, whereas traditional simulators allocate roughly $10^{10}$ memory locations for the same quantum operation. This means that, in general, the QVM 420 executes quantum operations more quickly than traditional simulators.

Some other systems perform more efficient methods than fully tensoring up a matrix. These systems typically apply a k-qubit operator by way of O(k) nested for-loops (typically k+1), with each loop having a stride length depending on the qubits being acted upon. These systems typically have some number of subroutines for a selection of values of k. These subroutines are often called "kernels". For instance, a system might have a total of three kernels, for k=1, k=2, and k=3. Such systems are limited in their functionality; since the kernels must be either manually or computer generated for a limited number of values of k, the system is limited in the number of qubits an operator may act on. Moreover, since the kernels act on fixed values of k by way of O(k) for-loops, parallelization of the computation is potentially a complex problem which is challenging to program.

The QVM 420 mitigates this issue by avoiding manually or automatically generated kernels entirely. For example, the QVM 420 can be implemented with two for-loops regardless of k, the outer of which is trivially parallelized. This means that, in general, the QVM 420 executes a broader class of quantum operations more efficiently than other simulators.

Generally, the method presented for applying a quantum operation to a quantum state can be parallelized across different execution units (CPU cores, CPUs, etc.) without additional work or without changing the method. That is, one or more of the complex amplitudes stored in a local memory can be accessed and manipulated by one or more different processors simultaneously.

Various other considerations of the QVM 420 allow for additional improvements over traditional simulators.

X.A Modes of Operation

The QVM can execute method 700 in one of two modes: interpreted mode and compiled mode. In interpreted mode, the QVM accesses libraries storing the process steps, vectors, and matrices used in method 700. The libraries include the vector and matrices applicable to any combination of n total qubits, k acted on qubits, different quantum operations U, and qubit ordering that the quantum operation U acts on. Further, the library includes the processing steps and machine instructions for executing any of those combinations. In compiled mode, the QVM determines the vectors and matrices for the necessary combination of n total qubits, k acted on qubits, different quantum operations U, and qubit ordering that the quantum operation U acts on in real-time. In effect, the QVM 420 generates the machine instructions for executing a quantum operation in real-time.

X.B Just-in-Time Compilation

When operating in compiled mode, the QVM 420 can perform just-in-time compilations to increase the efficiency of a quantum operation. A just-in-time compilation replaces the machine instructions determined for a particular quantum operation with a more efficient set of machine instructions. Further, the just in time compilation replaces generalized machine instructions (e.g., Quil code) with a specialized native code (e.g., binary code) for a particular gate. The QVM 420 can perform a just-in-time compilation for a quantum operation based on n total qubits, k acted on qubits, different quantum operations U, and qubit ordering that the quantum operation U acts on in real-time.

For example, if the quantum operation U is a CNOT gate acting on two qubits, executing the quantum operation is a matrix multiplication of a 4×4 matrix on a length 4 vector. The matrix multiplication includes 16 complex multiplications and 12 complex additions, but can be reduced to a single transposition of complex amplitudes in the appropriate memory locations.

X.C Memory Access

The QVM 420 stores the virtual wavefunction as a vector of probability amplitudes in the shared memory 240 of the quantum cloud system 230. This allows any access node 210 with the appropriate API the ability to access the probability amplitudes of a virtual wavefunction in the shared memory. Therefore, the virtual wavefunction can be analyzed during state evolution. Further, this approach allows any access node (and corresponding processor) with the appropriate API to change probability amplitudes of the virtual wavefunction at any point. This can be useful for initializing a virtual wavefunction, correcting errors in a virtual wavefunction, etc.

X.D Stochastic Pauli Error Simulation

The QVM 420 can simulate stochastic errors that occur when executing a quantum operation on quantum processing systems. Stochastic errors are incoherent errors that occur when a quantum gate (or any other quantum operation) is applied to a qubit state. Stochastic errors can be quantum gate agnostic (i.e., can occur for any quantum gate) and do not constructively interfere when multiple stochastic errors occur when executing quantum operations.

The QVM 420 simulates stochastic errors by introducing a stochastic noise operation S to the quantum operation U. The stochastic noise operation is an operation configured to simulate the stochastic noise of the quantum operation executed on a quantum processing system. In some cases, the stochastic error noise operation is a Pauli channel. A Pauli channel introduces stochastic errors by introducing random stochastic rotations about three axes of the Bloch sphere. The stochastic errors occur along an axis of the Bloch sphere with a particular probability.

In various configurations, the QVM 420 can include options to execute quantum operations either with, or without, stochastic errors.

X.E Unitary Error Simulation

The QVM 420 can simulate unitary errors that occur when executing a quantum operation on quantum processing systems. Unitary errors are coherent errors that occur when a quantum gate (or any other quantum operation) is applied to a qubit state during execution of quantum operations on a quantum processing system. Unitary errors are, generally, associated with a specific quantum gate when the quantum gate is applied to a qubit state and each quantum gate can have a different unitary error.

The QVM 420 simulates unitary errors by replacing perfect quantum operations U with imperfect quantum operations U'. In some examples, the imperfect quantum operations U' are a Krauss operator. The imperfect quantum operations U' are configured to simulate the unitary error of the quantum operation U on a quantum processing system. Generally, the imperfect quantum operation can be implemented as a particular unitary error operation T executed in series with a particular quantum operation U. Each quantum operation U can have its own unitary error operation T In various configurations, the QVM 420 can include options to execute quantum operations either with, or without, unitary errors.

X.F Feynman Formalism

The QVM can also simulate a quantum operation using a multi-amplitude discrete path integral technique (discrete path technique) analogous to the Feynman path integral formalism of quantum mechanics. In this method, the QVM 420 initializes an initial virtual wavefunction $\varphi_i$ and a set F of final virtual wavefunctions $\varphi_f$. The QVM using the discrete path technique determines $\{\langle \varphi_f | P | \varphi_i \rangle | \varphi_f \in F\}$ for a quantum circuit P including quantum operations $U_i$. The QVM sums the probability amplitudes $\alpha$ for each trajectory from the initial bitstring state $\varphi_i$ to the final bitstring state $\varphi_f$. Each quantum operation $U_i$ in the quantum circuit connects any given intermediate virtual wavefunction state to at most k other complex amplitudes of the subsequent virtual wavefunction. Therefore, the complex amplitudes for the final virtual wavefunction can be calculated for the entire circuit P. This process is similar to calculating a propagator in the Feynman formalism using the techniques described in method 700.

X.G Density Matrix Evolution

In some embodiments, one or more density matrix simulations may be made to run on any of the systems described herein, and employ any of the methods described herein. In other words, the calculation techniques of the QVM may be applied to calculations on density matrices. Further, the techniques and systems described herein are also applicable to density matrix evolution.

Density matrices are mathematical constructs that allow one to represent a probability distribution of pure states. Such distributions are often called mixed states and are used in the study and computation of quantum systems. As an example, described herein is a technique for applying a k-qubit unitary operator U to a quantum state s. For n qubits, mathematically, a unitary operator U is a $2^k \times 2^k$ matrix and is applied to a quantum state s that is a column vector of $2^n$ complex amplitudes.

In an example, a density matrix r is a $2^n \times 2^n$ matrix and represents a probability distribution of pure quantum states. A density operator on a density matrix, also known as a super-operator, is written as $$r \to \Sigma_i A_i r B_i \qquad (1)$$

for matrices $A_i$ and $B_i$. For some selections of $A_i$ and $B_i$, these are called Kraus operators.

A density matrix calculation can be transformed into the equivalent of a quantum state calculation. For example, a density matrix r may be represented in vectorized form as, for example, vec(r). A system generates vec(r) by concatenating rows of the density matrix r to form a single linear vector. In other words, the (i,j)th element of the density matrix r corresponds to the $(2^n i+j)$th element of vec(r). Notably, vec(r) is compatible with the wavefunction formalism.

Without loss of generality, calculating the action of a superoperator effectively reduces to calculating one term of equation (1). To illustrate, using the examples above, $A_i r B_i$ can be determined as $$A_i r B_i = (A_i \otimes B_i^{T}) \text{vec}(r) \qquad (2)$$

which is equivalent to $$A_i r B_i = (A_i \otimes I)(I \otimes B_i^{T}) \text{vec}(r) \qquad (3)$$

In the context of quantum operators and quantum states, the operation $I \otimes B_i^{T}$ is equivalent to an operation $B_i^{T}$ acting on qubits $0, \ldots, n-1$, while $A_i \otimes I$ is equivalent to an operation $A_i$ acting on "qubits" $n, \ldots 2n-1$. These "qubits" do not represent physical qubits, but are a mathematical construction to assist with the representation of a density operator.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware, such as FPGAs.

In some embodiments, a QVM may be run on a computer system using "Non-Uniform Memory Architecture"—NUMA. In further embodiments a QVM may be run on a distributed machine, like a supercomputer. In embodiments other computer architectures and/or other computer components may be used beyond what has been described herein.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A method for determining a result of executing a quantum algorithm using a classical processing system, the method comprising:

receiving, from a client device, the quantum algorithm for execution on the classical processing system to determine the result, the quantum algorithm comprising a quantum operation acting on at least one qubit of a virtual wavefunction comprising a plurality of qubits, each combination of qubits of the virtual wavefunction represented by a complex amplitude stored at a memory location of the classical processing system;

determining, by the classical processing system and based on a number of quantum operations in the quantum algorithm, whether execution of the received quantum algorithm is more efficient on the classical processing system or on a quantum processing system;

responsive to determining execution is more efficient on the classical processing system based on the number of quantum operations in the quantum algorithm:

instantiating, by the classical processing system, a virtual quantum processing system configured to execute the quantum operation, the virtual quantum processing system configured to:

identify a set of virtual partial wavefunctions based on the qubits the quantum operation acts on and the qubits of the virtual wavefunction, each virtual partial wavefunction comprising a proper subset of one or more complex amplitudes of the virtual wavefunction;

access the proper subset of the one or more complex amplitudes of each virtual partial wavefunction in the set of virtual partial wavefunctions from a corresponding memory location of the classical processing system;

execute the quantum operation on the accessed complex amplitudes for each virtual partial wavefunction in the proper subset of the set of virtual partial wavefunctions to determine resulting complex amplitudes, the resulting complex amplitudes representing a state evolution of the virtual wavefunction, the execution comprising:

multiplying a matrix representing the quantum operation and a set of sub-bitstring vectors representing the virtual partial wavefunctions, wherein:

a number of qubits the quantum operation acts on is k, a number of qubits in the virtual wavefunction is n, a number of sub-bitstring vectors is $2^{n-k}$ and a vector size of the sub-bitstring vectors is based on the number of qubits the quantum operation acts on, the number of the virtual partial wavefunctions is based on the number of qubits the quantum operation acts on k and a number of qubits in the virtual wavefunction, the matrix is stored in the classical processing system and has a matrix size based on the number of qubits the quantum operations acts on k, and the multiplication multiplies the matrix representing the quantum operation by the $2^{n-k}$ sub-bitstring vectors; and store the resulting complex amplitudes in the memory of the classical processing system;

determining, by the virtual quantum processing system on the classical processing system, the result of executing the quantum algorithm based on the stored resulting complex amplitudes; and providing, by the classical processing system, the result of executing the quantum algorithm on the classical processing system to the client device; and responsive to determining execution is more efficient on the quantum processing system based on the number of quantum operations in the quantum algorithm:

executing the quantum algorithm on the quantum processing system; and providing, the result of executing the quantum algorithm on the quantum processing system to the client device.

2. The method of claim 1, wherein the quantum operation is represented by a matrix stored in the classical processing system with a matrix size based on a number of the qubits of the virtual wavefunction that the quantum operation is acting on.

3. The method of claim 2, wherein the number of the qubits of the virtual wavefunction is k and the matrix size of the matrix representing the quantum operation is $2^k \times 2^k$.

4. The method of claim 1, wherein the virtual wavefunction is represented by a bitstring vector stored in the classical processing system with a bitstring vector size based on a number of qubits in the virtual wavefunction.

5. The method of claim 4, wherein the number of qubits in the virtual wavefunction is n and the bitstring vector size is $2^n$.

6. The method of claim 1, wherein each of the virtual partial wavefunctions is represented by a bitstring subvector with a sub-bitstring vector sized based on the number of qubits the quantum operation is acting on.

7. The method of claim 6, wherein the number of qubits the quantum operation is acting on is k and the sub-bitstring vector size is $2^k$.

8. The method of claim 1, further comprising:

determining a stochastic quantum operation to introduce stochastic errors in the virtual wavefunction when the quantum operation is executed such that the determined result includes stochastic error, the stochastic quantum operation being based on the quantum algorithm; and executing the stochastic quantum operation.

9. The method of claim 1, further comprising:

determining a unitary quantum operation to introduce unitary errors in the virtual wavefunction when the quantum operation is executed such that the determined result includes unitary error, the unitary quantum operation being based on the quantum algorithm; and executing the unitary quantum operation.

10. The method of claim 1, wherein the complex amplitudes of each combination of qubits in the virtual wavefunction are accessible by an alternate processor of the classical processing system.

11. The method of claim 1, wherein the quantum operation is executed on each virtual partial wavefunction of the set of quantum sub-bitstrings by separate processors of the classical processing system.

12. The method of claim 1, wherein determining the result of the quantum algorithm comprises:

simulating a quantum measurement on at least one qubit of the virtual wavefunction based on the resulting complex amplitudes and a set of basis states for the quantum measurement.

13. The method of claim 1, wherein executing the quantum operation further comprises:

generating a set of machine instructions to execute the quantum operation on the set of virtual partial wavefunctions, wherein the set of machine instructions are executed by the classical processing system.

14. The method of claim 1, wherein the determination to instantiate the virtual quantum processing is based on a number of the plurality of qubits included in the quantum algorithm.

15. The method of claim 1, wherein the virtual quantum processing system is an application downloadable from a remote network system via a network.

16. The method of claim 1, wherein the client device is an application executing on a partition of the classical processing system.

17. The method of claim 1, wherein the quantum operation is a density operator.

18. The method of claim 17, wherein the density operator is a Krauss operator.

19. The method of claim 1, wherein the virtual wavefunction comprising the plurality of qubits is a concatenated density matrix comprising a plurality of values representing a probability distribution.

20. The method of claim 1, wherein the client device is the classical processing system.

21. A client device comprising:

one or more classical processors, a datastore comprising a non-transitory computer-readable storage medium storing instructions for an application for a virtual quantum processing system, the application configured to execute a quantum operation using classical processors, and the instructions, when executed by the one or more classical processors, cause the classical processors to perform steps comprising:

accessing a quantum algorithm comprising the quantum operation for execution using the classical processors to determine a result, the quantum algorithm comprising a quantum operation acting on at least one qubit of a virtual wavefunction comprising a plurality of qubits, each combination of qubits of the virtual wavefunction represented by a complex amplitude stored at a memory location on the data-store;

determining, by the classical processing system and based on a number of quantum operations in the quantum algorithm, whether execution of the accessed quantum algorithm is more efficient on the classical processing system or on a quantum processing system;

responsive to determining execution is more efficient on the classical processing system based on the number of quantum operations in the quantum algorithm, instantiating, by the classical processors, a virtual quantum processing system configured to execute the quantum operation, the virtual quantum processing system configured to:

identify a set of virtual partial wavefunctions based on the qubits the quantum operation acts on and the qubits of the virtual wavefunction, each virtual partial wavefunction comprising a subset of one or more complex amplitudes of the virtual wavefunction;

access the subset of the one or more complex amplitudes of each virtual partial wavefunction in the set of virtual partial wavefunctions from a corresponding memory location of the classical processing system;

execute the quantum operation on the accessed complex amplitudes for each virtual partial wavefunction in the subset of the set of virtual partial wavefunctions to determine resulting complex amplitudes, the resulting complex amplitudes representing a state evolution of the virtual wavefunction, the execution comprising:

multiplying a matrix representing the quantum operation and a set of sub-bitstring vectors representing the virtual partial wavefunctions, wherein:

a number of qubits the quantum operation acts on is k, a number of qubits in the virtual wavefunction is n, a number of sub-bitstring vectors is $2^{n-k}$ and a vector size of the sub-bitstring vectors is based on the number of qubits the quantum operation acts on, the number of the virtual partial wavefunctions is based on the number of qubits the quantum operation acts on k and a number of qubits in the virtual wavefunction, the matrix is stored in the classical processing system and has a matrix size based on the number of qubits the quantum operations acts on k, and the multiplication multiplies the matrix representing the quantum operation by the $2^{n-k}$ sub-bitstring vectors; and store the resulting complex amplitudes in the memory of the classical processors;

determining, by the virtual quantum processing system on the classical processors, the result of executing the quantum algorithm based on the stored resulting complex amplitudes; and providing, by the classical processors, the result of the quantum algorithm to the client device; and responsive to determining execution is more efficient on the quantum processing system based on the number of quantum operations in the quantum algorithm:

transmitting the quantum algorithm to a quantum processing system for execution; and providing, the result of the quantum algorithm executed on the quantum processing system.

22. The client device of claim 21, wherein the classical processors perform steps further comprising:

receiving, from a network system and at the client device via a network, an application for a virtual quantum processing system and configured to execute a quantum operation using the classical processors.

23. A system comprising:

one or more classical processors for a classical processing system;

one or more qubits for a quantum processing system; and a datastore comprising a non-transitory computer-readable storage medium storing instructions that, when executed by the one or more classical processors, cause the classical processors to perform steps comprising:

receiving, from a client device, a quantum algorithm for execution on the classical processors to determine a result, the quantum algorithm comprising a quantum operation acting on at least one qubit of a virtual wavefunction comprising a plurality of qubits, each combination of qubits of the virtual wavefunction represented by a complex amplitude stored at a memory location of the classical processors;

determining, by the classical processing system and based on a number of quantum operations in the quantum algorithm, whether execution of the received quantum algorithm is more efficient on the classical processing system or on a quantum processing system;

responsive to determining execution is more efficient on the classical processing system based on the number of quantum operations in the quantum algorithm, instantiating, by the classical processors, a virtual quantum processing system configured to execute the quantum operation, the virtual quantum processing system configured to:

identify a set of virtual partial wavefunctions based on the qubits the quantum operation acts on and the qubits of the virtual wavefunction, each virtual partial wavefunction comprising a subset of one or more complex amplitudes of the virtual wavefunction;

access the subset of the one or more complex amplitudes of each virtual partial wavefunction in the set of virtual partial wavefunctions from a corresponding memory location of the classical processing system;

execute the quantum operation on the accessed complex amplitudes for each virtual partial wavefunction in the subset of the set of virtual partial wavefunctions to determine resulting complex amplitudes, the resulting complex amplitudes representing a state evolution of the virtual wavefunction, the execution comprising:

multiplying a matrix representing the quantum operation and a set of sub-bitstring vectors representing the virtual partial wavefunctions, wherein:

a number of qubits the quantum operation acts on is k, a number of qubits in the virtual wavefunction is n, a number of sub-bitstring vectors is $2^{n-k}$ and a vector size of the sub-bitstring vectors is based on the number of qubits the quantum operation acts on, the number of the virtual partial wavefunctions is based on the number of qubits the quantum operation acts on k and a number of qubits in the virtual wavefunction, the matrix is stored in the classical processing system and has a matrix size based on the number of qubits the quantum operations acts on k, and the multiplication multiplies the matrix representing the quantum operation by the $2^{n-k}$ sub-bitstring vectors; and store the resulting complex amplitudes in the memory of the classical processors;

determining, by the virtual quantum processing system on the classical processors, the result of executing the quantum algorithm based on the stored resulting complex amplitudes; and providing, by the classical processors, the result of the quantum algorithm to the client device; and responsive to determining execution is more efficient on the quantum processing system based on the number of quantum operations in the quantum algorithm:

executing the quantum algorithm to the quantum processing system; and providing, the result of the quantum algorithm executed on the quantum processing system.

24. The system of claim 23, wherein the client device is an application executing on a partition of the datastore.

25. The method of claim 1, wherein the virtual wavefunction comprising a plurality of qubits includes three qubits and the quantum operation acts on the three qubits.

26. The method of claim 1, wherein the virtual wavefunction comprising a plurality of qubits includes five qubits and the quantum operation acts on the five qubits.

27. The method of claim 1, wherein the virtual wavefunction comprising a plurality of qubits includes nine qubits and the quantum operation acts on the nine qubits.

* * * * *